United States Patent
Eckhouse et al.

(10) Patent No.: US 10,942,439 B2
(45) Date of Patent: Mar. 9, 2021

(54) REAL-TIME TRACKING FOR THREE-DIMENSIONAL IMAGING

(71) Applicant: EVA—ESTHETIC VISUAL ANALYTICS LTD., Yokneam (IL)

(72) Inventors: Vardit Eckhouse, Kerem Maharal (IL); Oded Cohen, Tivon (IL); Igor Altman, Haifa (IL)

(73) Assignee: EVA—ESTHETIC VISUAL ANALYTICS LTD., Yokneam (IL)

( * ) Notice: Subject to any disclaimer, the term of this patent is extended or adjusted under 35 U.S.C. 154(b) by 0 days.

(21) Appl. No.: 16/473,038

(22) PCT Filed: Dec. 21, 2017

(86) PCT No.: PCT/IL2017/051376
§ 371 (c)(1),
(2) Date: Jun. 24, 2019

(87) PCT Pub. No.: WO2018/116305
PCT Pub. Date: Jun. 28, 2018

(65) Prior Publication Data
US 2020/0089097 A1    Mar. 19, 2020

Related U.S. Application Data

(60) Provisional application No. 62/437,933, filed on Dec. 22, 2016.

(51) Int. Cl.
*G03B 35/08* (2006.01)
*H04N 13/204* (2018.01)
*G06T 17/00* (2006.01)

(52) U.S. Cl.
CPC .............. *G03B 35/08* (2013.01); *G06T 17/00* (2013.01); *H04N 13/204* (2018.05); *G06T 2207/10021* (2013.01); *G06T 2207/10028* (2013.01)

(58) Field of Classification Search
CPC ...... G03B 35/08; H04N 13/204; G06T 17/00; G06T 2207/10021; G06T 2207/10028;
(Continued)

(56) References Cited

U.S. PATENT DOCUMENTS

| 5,168,327 A | 12/1992 | Yamawaki |
| 6,578,767 B1 | 6/2003 | Barkan et al. |

(Continued)

FOREIGN PATENT DOCUMENTS

| CN | 102494609 B | 9/2013 |
| WO | 2012115862 A2 | 8/2012 |

OTHER PUBLICATIONS

Kari Pulli, "Surface Reconstruction and Display from Range and Color Data", Graphical Models 62, 165-201 (Year: 2000).*
(Continued)

*Primary Examiner* — William A Beutel
(74) *Attorney, Agent, or Firm* — The Roy Gross Law Firm, LLC; Roy Gross

(57) ABSTRACT

A system, comprising: a stereoscopic camera configured to acquire multiple pairs of images of a surface; a display; and a processor configured to: sequentially acquire multiple image pairs of a surface from the camera; incrementally construct a 3D model from the image pairs concurrently with the sequential image acquisition, by: for each currently acquired image pair, registering the currently acquired image pair to a location on the 3D model, and adding the currently acquired image pair to the 3D model when: a) the registration succeeds and b) a delta of the registered image pair exceeds a threshold; rendering the incremental construction of the 3D model on the display; and concurrently tracking the incremental construction by displaying a graphic indicator that simultaneously indicates: i) the registered location, ii) when the viewing distance is within a
(Continued)

focal range, and iii) when the viewing distance is not within a focal range.

20 Claims, 20 Drawing Sheets

(58) Field of Classification Search
CPC .......... G06T 7/596; G06T 7/579; G06T 7/33; G06T 7/593; G01B 11/00
See application file for complete search history.

(56) References Cited

U.S. PATENT DOCUMENTS

| | | | |
|---|---|---|---|
| 8,619,148 B1 | 12/2013 | Watts et al. | |
| 2002/0149691 A1 | 10/2002 | Pereira et al. | |
| 2003/0198377 A1 | 10/2003 | Ng | |
| 2005/0043837 A1* | 2/2005 | Rubbert | A61C 9/0046 |
| | | | 700/98 |
| 2007/0171220 A1 | 7/2007 | Kriveshko | |
| 2008/0013943 A1 | 1/2008 | Rohaly et al. | |
| 2008/0259354 A1 | 10/2008 | Gharib et al. | |
| 2009/0022393 A1 | 1/2009 | Bar-Zohar et al. | |
| 2009/0141966 A1 | 6/2009 | Chen et al. | |
| 2009/0295908 A1 | 12/2009 | Gharib et al. | |
| 2010/0209294 A1 | 8/2010 | Owen et al. | |
| 2011/0074932 A1 | 3/2011 | Gharib et al. | |
| 2011/0206254 A1 | 8/2011 | Patwardhan | |
| 2013/0335417 A1* | 12/2013 | McQueston | A61B 6/5205 |
| | | | 345/424 |
| 2014/0118500 A1 | 5/2014 | Liu et al. | |
| 2014/0120493 A1 | 5/2014 | Levin | |
| 2014/0240354 A1 | 8/2014 | Ma et al. | |
| 2014/0340488 A1 | 11/2014 | Shibazaki et al. | |
| 2015/0011848 A1 | 1/2015 | Ruchti et al. | |
| 2015/0256813 A1* | 9/2015 | Dal Mutto | G06T 7/593 |
| | | | 348/47 |
| 2015/0358613 A1 | 12/2015 | Sandrew et al. | |
| 2016/0154244 A1 | 6/2016 | Border et al. | |
| 2016/0337612 A1 | 11/2016 | Im et al. | |
| 2016/0360104 A1 | 12/2016 | Zhang et al. | |
| 2017/0109888 A1 | 4/2017 | de Lima et al. | |
| 2019/0133513 A1 | 5/2019 | Patwardhan | |

OTHER PUBLICATIONS

Jun-Sik Kim, "Multi-aperture Telecentric Lens for 3D Reconstruction", Optics Letters, vol. 36, No. 7, pp. 1050-1052, Apr. 1 (2011).
Kari Pulli and Linda G. Shapiro, "Surface Reconstruction and Display from Range and Color Data", Graphical Models 62, 165-201 (2000).

* cited by examiner

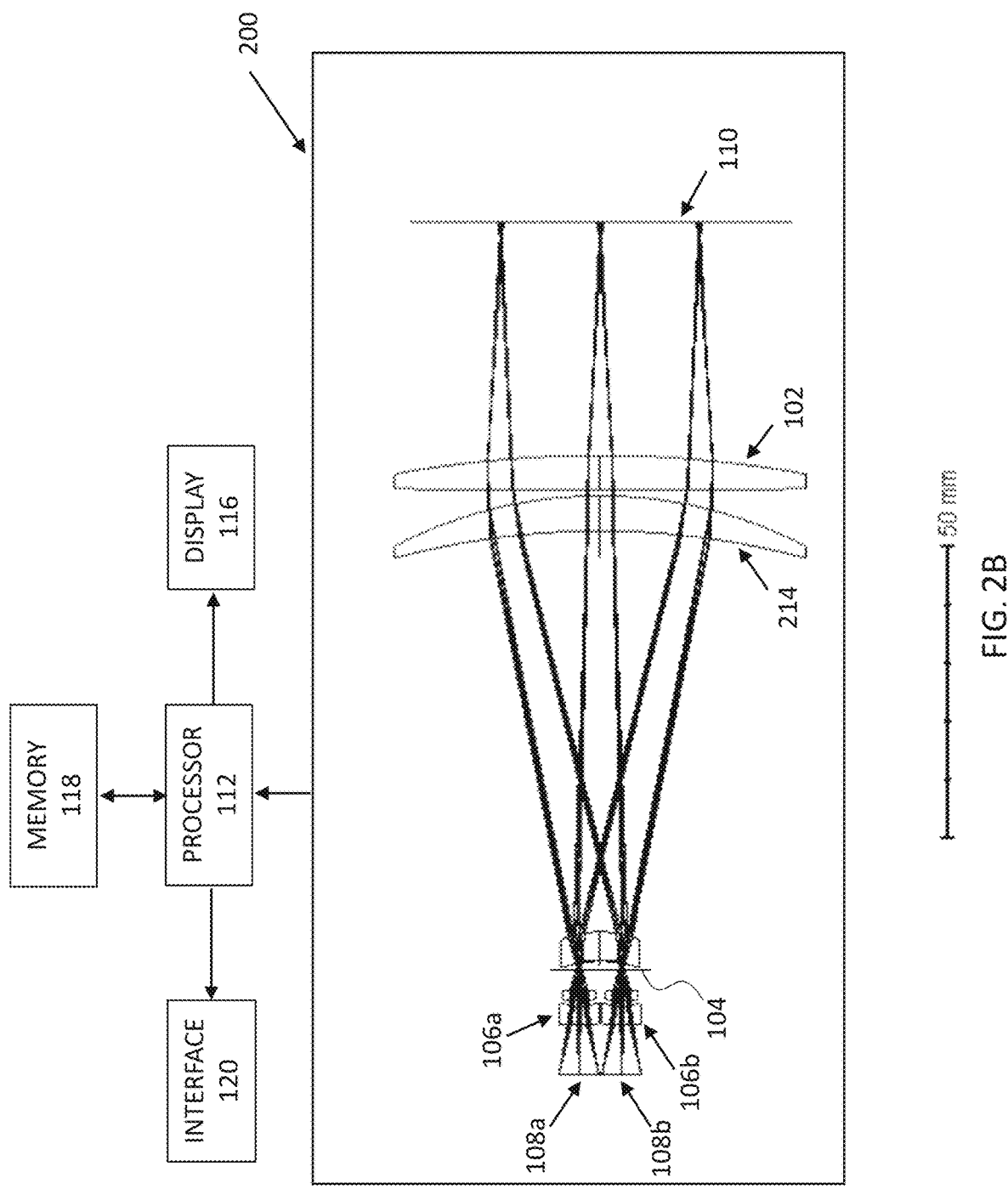

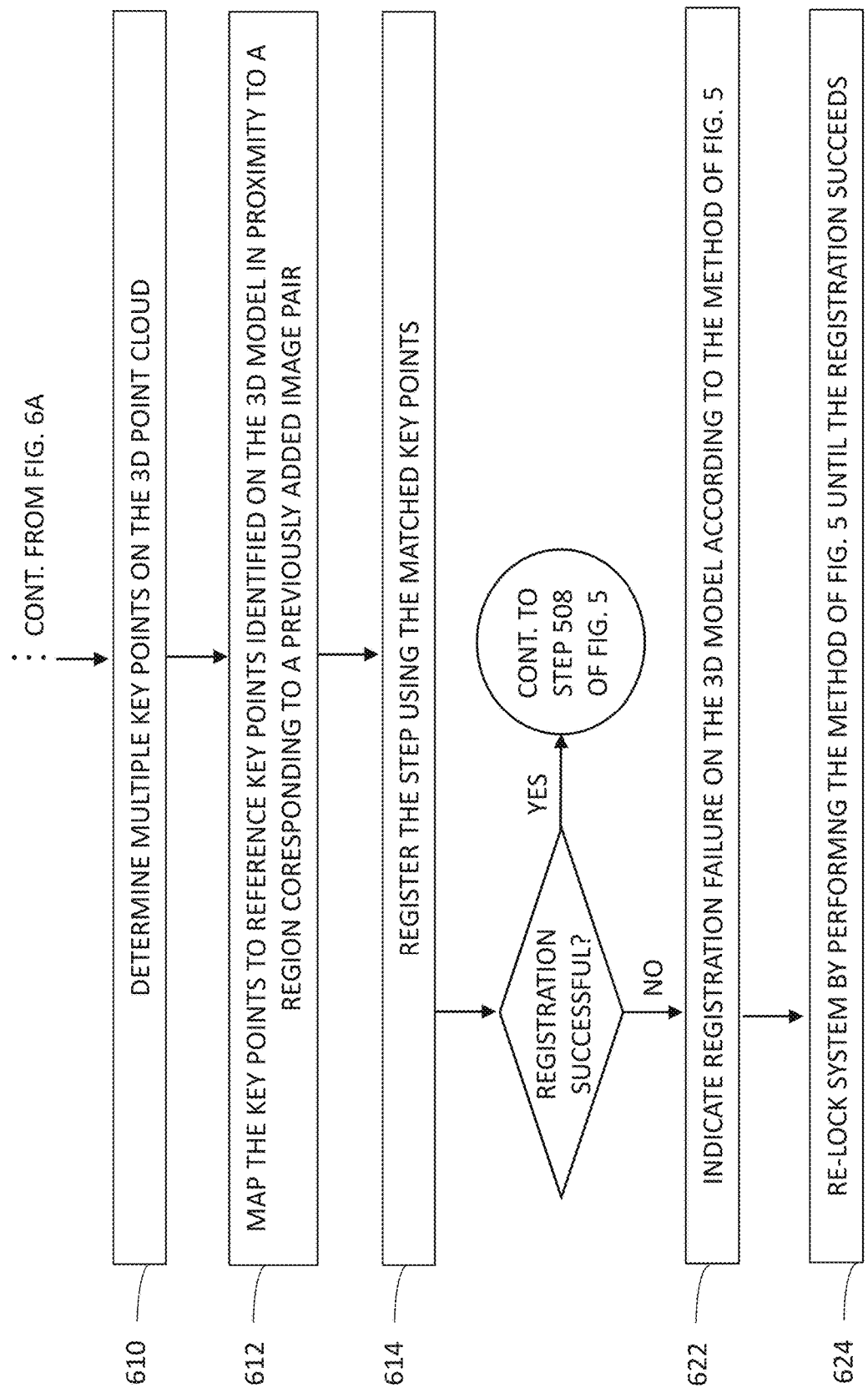

REAL-TIME TRACKING FOR THREE-DIMENSIONAL IMAGING

CROSS-REFERENCE TO RELATED APPLICATIONS

This application is a National Phase of PCT Patent Application No. PCT/IL2017/051376 titled "REAL-TIME TRACKING FOR THREE-DIMENSIONAL IMAGING", having International filing date of Dec. 21, 2017, which claims the benefit of priority of U.S. Provisional Patent Application No. 62/437,933, filed on Dec. 22, 2016. The contents of the above applications are all incorporated by reference as if fully set forth herein in their entirety.

BACKGROUND

The invention relates to the field of three-dimensional (3D) imaging.

Conventional cameras transform a three-dimensional view of an object into a two dimensional image. Typically, the depth dimension, corresponding to the distance between the focal plane of the captured image and the camera, is lost. To include a depth characteristic, some optical systems use two cameras to capture a pair of stereo images of the object, much the way our eyes work. Each image of the pair is acquired from a slightly different viewing angle, and the discrepancy between the two images is used to measure depth.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a system, comprising: a stereoscopic camera configured to acquire multiple pairs of images of a surface; a display; and a processor configured to: sequentially acquire multiple pairs of stereoscopic images of a surface from the stereoscopic camera; incrementally construct a 3D model of the surface from the image pairs concurrently with the sequential image acquisition, wherein incrementally constructing comprises: for each currently acquired image pair, registering the currently acquired image pair to a location on the 3D model, and adding the currently acquired image pair to the 3D model at the registered location when: a) the registration succeeds and b) a delta of the registered image pair exceeds a threshold; rendering the incremental construction of the 3D model on the display; and concurrently with the sequential image acquisition, tracking the incremental construction of the 3D model by displaying a tracking graphic indicator on the rendition of the incremental construction of the 3D model that simultaneously indicates: i) the registered location, ii) when a viewing distance for the currently acquired image pair is within a focal range of the camera, and iii) when the viewing distance is not within a focal range of the camera.

Another embodiment provides a computer program product comprising a non-transitory computer-readable storage medium having program code embodied thereon, the program code executable by at least one hardware processor to track the scanning of a surface, by: sequentially acquiring multiple pairs of stereoscopic images of a surface from a camera; incrementally constructing a 3D model of the surface from the image pairs concurrently with the sequential image acquisition, wherein incrementally constructing comprises: for each currently acquired image pair, registering the currently acquired image pair to a location on the 3D model, and adding the currently acquired image pair to the 3D model at the registered location when: a) the registration succeeds and b) a delta of the registered image pair exceeds a threshold; rendering the incremental construction of the 3D model on a display; and concurrently, with the sequential image acquisition, tracking the incremental construction of the 3D model by displaying a tracking graphic indicator on the rendition of the incremental construction of the 3D model that simultaneously indicates: i) the registered location, ii) when the viewing distance is within a focal range of the camera, and iii) when the viewing distance is not within a focal range of the camera.

A further embodiment provides a method for tracking the scanning of a surface, comprising: sequentially acquiring multiple pairs of stereoscopic images of a surface from a camera; incrementally constructing a 3D model of the surface from the image pairs concurrently with the sequential image acquisition, wherein incrementally constructing comprises: for each currently acquired image pair, registering the currently acquired image pair to a location on the 3D model, and adding the currently acquired image pair to the 3D model at the registered location when: a) the registration succeeds and b) a delta of the registered image pair exceeds a threshold; rendering the incremental construction of the 3D model on a display; and concurrently, with the sequential image acquisition, tracking the incremental construction of the 3D model by displaying a tracking graphic indicator on the rendition of the incremental construction of the 3D model that simultaneously indicates: i) the registered location, ii) when the viewing distance is within a focal range of the camera, and iii) when the viewing distance is not within a focal range of the camera.

In some embodiments, the processor is further configured to indicate on the rendition of the incremental construction a comparison between a viewing distance of the currently acquired image pair and an optimal viewing distance.

In some embodiments, the processor is configured to indicate the comparison by displaying a distance graphic indicator corresponding to the viewing distance of the currently acquired image pair superimposed with the tracking graphic indicator.

In some embodiments, the processor is configured to register the currently acquired image pair to a location on the 3D model by: calculating a distance between the camera and the surface as a function of a disparity of the currently acquired image pair, determining a point cloud for the currently acquired image pair using the calculated distance, and mapping multiple key-points in the point cloud to a region on the 3D model in proximity to a most recently added image pair, determining from the mapping when the registration succeeds and when the registration fails, calculating the delta as a function of a discrepancy between the mapped point cloud and the 3D model when the registration succeeds, and wherein adding the currently acquired image pair to the 3D model comprises adding the mapped point cloud to the 3D model.

In some embodiments, the processor is configured to determine the point cloud by: binning the image pair, calculating a low resolution distortion from the binned image pair, calculating an average distance from the low resolution distortion, using the average distance to select a distortion correction table corresponding to the average distance, applying the selected distortion table to correct a distortion of the image pair, and wherein the disparity of the image pair comprises a disparity of the corrected image pair, and wherein determining a point cloud comprises determining the point cloud from the corrected image pair.

In some embodiments, the processor is configured to track the incremental construction by indicating on the rendition of the incremental construction when the registration succeeds and when the registration fails.

In some embodiments, the processor is configured to indicate when the registration succeeds by displaying the tracking graphic indicator using a first color, and wherein the processor is configured to indicate when the registration fails by displaying the tracking graphic indicator using a second color.

In some embodiments, the processor is further configured to, responsive to determining that the registration fails, execute a relocking procedure.

In some embodiments, the relocking procedure comprises attempting to register the most recently acquired image pair in proximity to the registered location corresponding to a previously added image pair until the registration succeeds, wherein the previously added image pair is selected from a group consisting of: the ten most recently added image pairs, the twenty most recently added image pairs, the thirty most recently added image pairs, and the forty most recently added image pairs.

In some embodiments, the system further comprises a user interface, wherein the processor is configured to receive a user-indicated location via the user interface, and wherein the relocking procedure comprises registering the most recently acquired image pair in proximity to the user-indicated location on the 3D model.

In some embodiments, the system further comprises a memory, wherein the processor is further configured to retrieve a previously constructed 3D model from the memory, wherein registering the currently acquired image pair comprises registering to a location on the retrieved previously constructed 3D model, and wherein adding the currently acquired image pair at the registered location comprises adding the currently acquired image pair to the previously constructed 3D model.

In some embodiments, rendering the incremental construction further comprises differentiating between the added acquired image pairs and the previously constructed 3D model.

In some embodiments, the rendering the incremental construction of the 3D model on the display comprises continually adjusting the orientation of the 3D model responsive to detected changes in at least one of a horizontal and a vertical viewing angle of said stereoscopic camera.

In some embodiments, the processor is configured to calculate at least one of the horizontal and the vertical viewing angle of said stereoscopic camera from the distortion correction table.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 2A-2B illustrate an optical imaging system in accordance with another embodiment;

FIGS. 6A-6B taken together show a flowchart of a method to determine a point cloud from an image pair, in accordance with an embodiment;

DETAILED DESCRIPTION

A system and method are disclosed herein for implementing real-time tracking for 3D image reconstruction. A stereoscopic camera scans a surface and provides a stream of image pairs that are incrementally added to construct a high-resolution three-dimensional (3D) model of the surface in real-time. The camera may be a hand-held camera, and thus the user may require feedback to ensure that the camera is positioned at the correct distance and orientation from the surface in order to capture useful, quality images. To provide such feedback, the system tracks the scanning by the camera to the construction of the model in real-time. The construction of the 3D model is displayed to the user while scanning, and the addition of newly acquired images are indicated in real-time on the displayed 3D model, allowing the user to see the relative location of the currently scanned surface on the 3D model.

The description below describes a stereoscopic optical system (FIGS. 1A-1B, and 2A-2B) for capturing high resolution image pairs, as well as methods for constructing a 3D model from those image pairs. However, it may be appreciated that this combination is not meant to be limiting, and the method may use other optical systems for acquiring the image pairs necessary to construct the model.

Figure 1A:
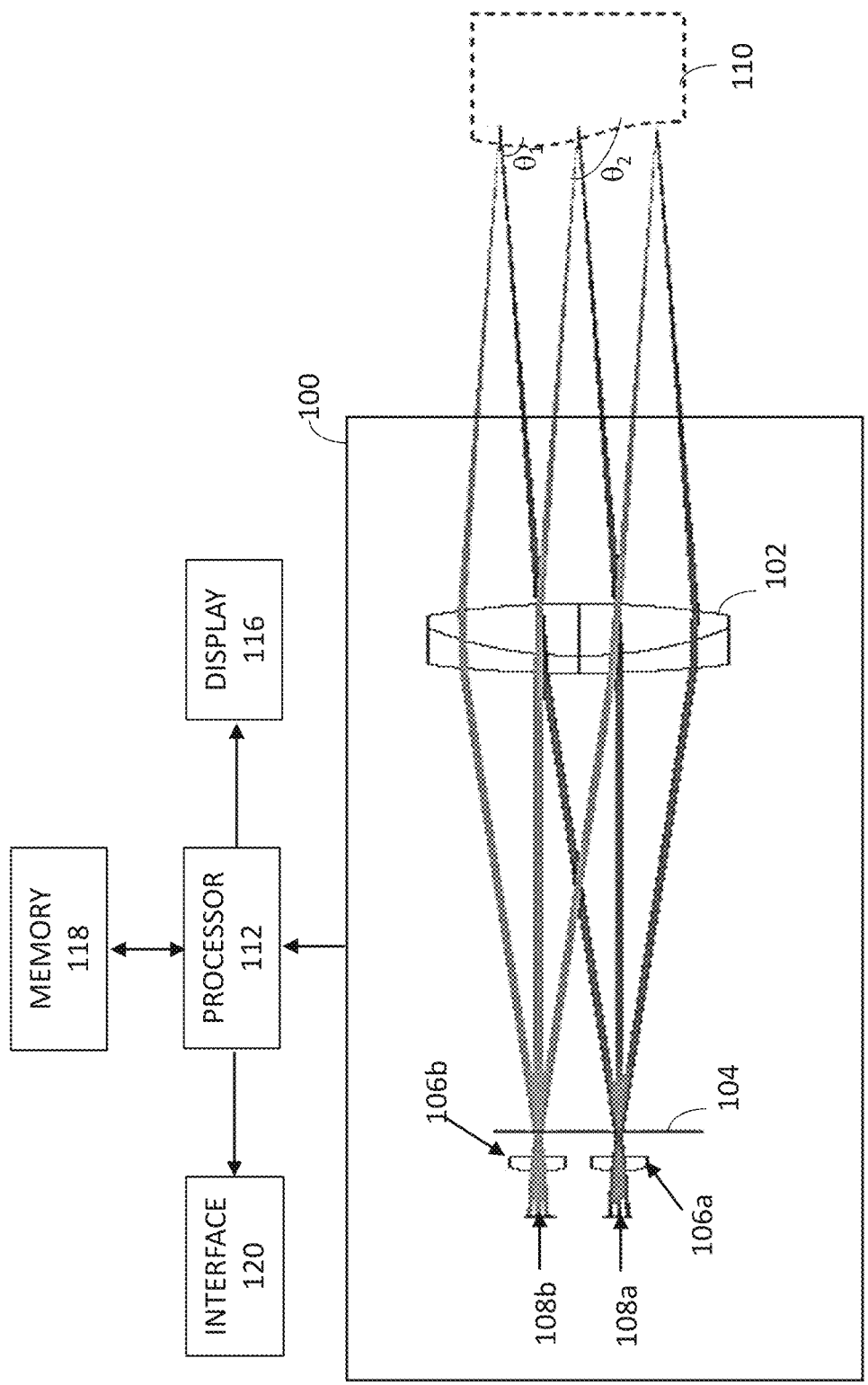
FIGS. 1A-1B, taken together, an optical imaging system in accordance with an embodiment.
Figure 1B:
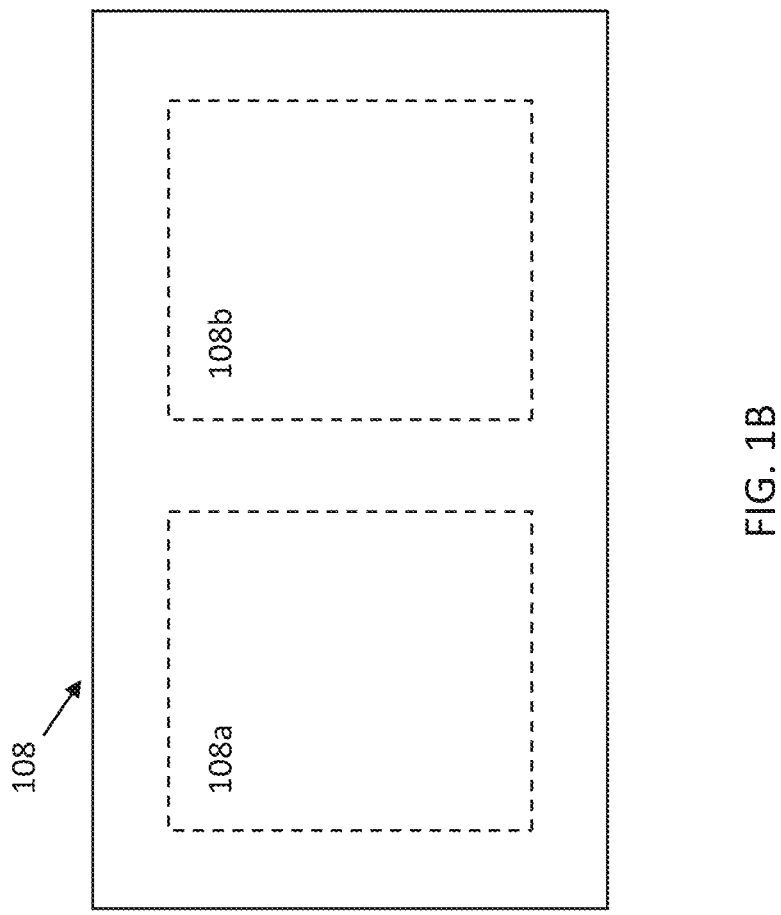

Reference is now made to FIGS. 1A-1B which, taken together, show a stereoscopic optical imaging system for providing multiple high resolution image pairs for constructing a 3D model, in accordance with an embodiment.

An imaging system 100, such as a camera, is provided to capture multiple stereo images of a 3D object 110, such as skin. Camera 100 is provided with a front (objective) lens 102 for collecting light reflected off object 110. The collected light is transmitted through one or more apertures of a mask 104 to a pair of back lenses 106a and 106b, which focus the collected light onto one or more sensors 108, such as may comprise any suitable imaging sensor, for example a charged coupled device (CCD) or a complementary metal-oxide semiconductor (CMOS). Optionally, the collected light may be collected at multiple regions of a single sensor 108, shown in FIG. 1B as two sensor regions 108a, 108b. Sensor regions 108a, 108b may capture multiple pairs of images of object 110 in stereo. The captured image pairs may be received by a processor 112 which uses the image pairs to construct a 3D model of object 110 and store the model in a memory 118. The constructed 3D model may be rendered on a display 116.

Referring to FIG. 1B, an exemplary view of sensor 108 having two distinct regions, 108a and 108b is shown. Alternatively, multiple individual sensors 108a and 108b may be provided for each of the imaging systems.

Camera 100 may constitute two imaging systems, each system comprising one of lenses 106a and 106b and one of sensor regions 108a and 108b, and sharing common objective 102. The two imaging systems may allow imaging along separate optical paths, each corresponding to a different one of viewing angles θ1, θ2 off of object 110, thereby allowing simultaneous stereo image acquisition. Each of lenses 106a and 106b and sensor regions 108a and 108b may be dedicated one of the optical paths. This design may allow the overall length of the imaging systems to be constrained within a predefined size limitation, such as for implementing within a hand-held device. Alternatively, a separate objective (not shown) may be provided for each optical path.

The imaging systems may be telecentric in the sample space of object 110 such as by positioning mask 104 in the rear focal plane of objective 102, allowing to decouple the defocusing and magnification of object 110. Optionally, back lenses 106a and 106b may operate under telecentric conditions such as by positioning mask 104 in the front focal plane of back lenses 106a and 106b. Optionally, the distance between mask 104 to back lenses 106a and 106b may be less than the focal length of back lenses 106a and 106b to allow the images of object 110 to expand on reaching the corners of sensor regions 108a and 108b. The telecentric imaging described thus may allow for uniform scaled imaging by providing a constant field of view (FOV), and thus, regions of object 110 positioned either above or below the best-focus plane may be imaged at the same size-scale as regions positioned at the optimum focus. This property may be useful when combining the multiple different captured images by processor 112 for performing the 3D reconstruction of object 110.

Mask 104 may have two or more apertures for transmitting the collected light, each aperture corresponding to a different one of the optical paths. In one implementation, mask 104 includes a pair of round holes to produce the desired F-number (F #) at object 110, such as illustrated in FIG. 1A, where F # is understood to be a measure of the amount of light collected by imaging system 100.

System 100 may be designed to image object 110 positioned at or near the front focal plane of the front lens such that sensor regions 108a and 108b are infinite conjugates. Thus, light reflected off object 110 at angle θ1 may be focused via objective 102 through one aperture of mask 104 and focused via lens 106a onto sensor region 108a, and light reflected off sample 110 at angle θ2 may be focused via objective 102 through a second aperture of mask 104 and focused via lens 106b onto sensor region 108b. In this manner, different points on object 110 imaged at different angles θ1, θ2 may be mapped onto different regions of the mask plane and different regions of the sensor plane, comprising a different imaging system for each viewing angle. Similarly, light rays reflecting off a single point of object 110 at different angles θ1, θ2 may be parallel when they arrive at mask 104, and transmitted, respectively through the different apertures via back lenses 106a and 106b to sensor regions 108a and 108b. In this manner, the two imaging systems together allow the simultaneous stereo imaging from multiple different angular views of object 110. Optionally, each viewing angle may be imaged sequentially at sensor 108.

The apertures on mask 104 may be positioned symmetrically opposite about the viewing axis of camera 100, allowing two slightly different views of the 3D surface to be obtained. The disparity Δ between the two different captured views may be computed and used to determine a depth attribute of the imaged 3D surface. The disparity may be computed as the differences between the lateral (X, Y) positions of one or more identified features in the two images. A 3D map of the imaged object may be formed by computing the disparity between each identified feature in the two captured views. The disparity may be computed using any suitable algorithm such as are known in the art of stereoscopy. The depth can be calculated using the following equation:

$$Z = F_1 + \Delta F_1^2 / (F_2 b) \quad (1)$$

Where $F_1$ is the front lens (objective) focal length, $F_2$ is the back lens focal length, b is the aperture spacing, Δ is the disparity, and Z is the depth. Values for $F_1$ may range between 170-180 millimeters (mm)±10%, values for $F_2$ may range between 25-35 mm±10%, and values for b may range from 15 to 20 mm±10%.

Typically, there is a tradeoff between depth of focus, resolution and light level. For round apertures this tradeoff may be described by the following equations:

$$\text{Lateral Resolution (Rayleigh Criterion, Airy Disk Radius)} = 1.22\lambda(F_2/D_A) \quad (2)$$

$$\text{Diffraction-Limited Depth of Focus} = \pm 2\lambda(F_1/D_A)^2 \quad (3)$$

$$\text{Light} \sim (D_A/F_1)^2 \quad (4)$$

where $D_A$ is the diameter of the aperture and λ is the wavelength.

The field of view (FOV) of an imaging system is governed by the diameter $D_L$ of objective lens 102, focal length $F_1$, and F # of the objective, as follows:

$$\text{FOV} \leq D_L - F_1 \times \alpha - F_1/F\# \quad (5),$$

where α is the angle between the right and left images as measured in radians.

Since a large FOV typically requires a large objective, resulting in a heavy and bulky optical system, the FOV may be constrained to allow camera 100 to have a size and weight that are suitable for a handheld device. To compensate for a smaller FOV, object 110 may be scanned to capture many consecutive image pairs. Equation (1) may be applied to each of the image pairs acquired using the stereo imaging system above, to calculate the depth attribute, or a 3D point cloud, for each image pair. A registration algorithm may be used to add all the calculated 3D point clouds together and form a large 3D point cloud representing the scanned region.

Any noise of a single 3D point cloud may be accumulated in the registration process, resulting in a significant noise level for the large 3D point cloud. To limit the sensitivity to noise, camera 100 may be designed such that the angle α between the left and right images (the image pairs acquired in stereo), may be substantially small, such as ~6°. Alternatively, the angle α between the left and right images may range from 5.5° and 6.5°, or 5° and 7°, or 4° and 8°. Thus, the features in the left image and right image may be very similar, allowing a high degree of accuracy in discerning features along the lateral, x, and vertical, y axes. However, there may remain a non-negligible distortion along the depth, z axis.

Figure 2A:
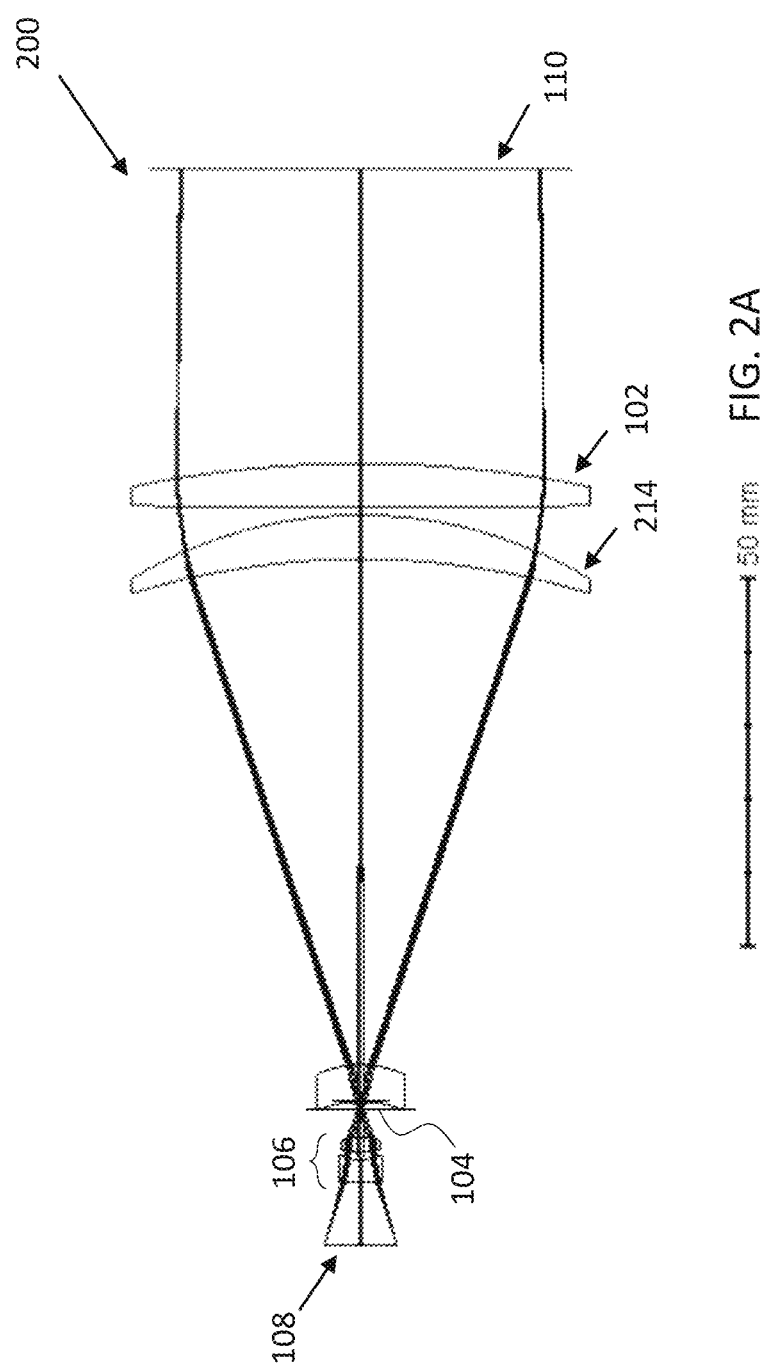

Reference is now made to FIGS. 2A-2B which illustrate an optical imaging system 200 having a corrective lens to reduce optical distortion, in accordance with another embodiment.

Distortion is an optical aberration which incorrectly maps a point on the real object to the image space. This incorrect mapping of points may have a substantial effect on 3D point clouds. Following Eq. (1), the relationship dz between z (depth) and disparity (Δ) in a system with a relatively small angle between left and right images, such as ~6° (60) is dz~30Δ. In such a system, even very low distortion, such as tenths of a percent, may have a non-negligible effect on the large 3D point cloud. To avoid such errors, telecentric optical imaging system 200 may capture images with very low distortion, such as <0.5%. Additionally, telecentric optical imaging system 200 provides a constant FOV with a uniform number of pixels.

The distortion in an optical system is also a function of depth; when in focus, an optical system may acquire images with very low distortion, however images acquired far from focus may suffer from high distortion. To address this problem, a lens 214 may be provided to reduce the distortion of the optical system and change very gradually along the entire depth of focus, resulting in a relatively low distortion along the depth of focus. By reducing the distortion for each captured image, the cumulative error for the 3D point cloud resulting from the registration may be reduced significantly.

FIG. 2A shows a single aperture system for imaging object 110. Light reflected off object 110 is collected by objective 102. The collected light is focused by corrective lens 214 and transmitted through the aperture of mask 104, via one or more back lenses 106 onto sensor 108.

The system of FIG. 2B is substantially similar to that of FIGS. 1A-1B having two imaging systems for two optical paths each corresponding to a different viewing angle of object 110, with the notable difference that corrective lens 214 is positioned between objective 102 and the aperture plane of mask 104. Lens 102 coupled with lens 214 may reduce distortion of images acquired using system 200. Light reflected off object 110 in two separate optical paths is collected by objective 102 coupled with lens 214, focused onto mask 104, and transmitted through multiple aperture pairs of mask 104 via back lenses 106a and 106b onto sensor regions 108a and 108b, respectively.

The overall length of the system 200 of FIG. 2A may range, for example, from 110 to 130 mm. In one embodiment, the overall length is approximately 120 mm±10%. The maximum diameter of system 200 may range, for example, from 60 to 80 mm, and in one embodiment may be approximately 70 mm±10%. The average distortion may range from 0.4% to 0.6% and in one embodiment may be approximately 0.5%. The FOV may range, for example, from 30×30 mm to 60×35 mm, and in one embodiment, may be approximately 60×30 mm±10%. The depth of focus may range, for example, from 2 mm to 35 mm, and in one embodiment, may be approximately 20 mm±10%. The 3D resolution may range, for example, from 80 to 100 microns, and in one embodiment, may be 100 microns±10%.

Sensor regions 108a and 108b configured with either of systems 100 or 200 may acquire multiple image pairs and transmit them for processing by processor 112. The image acquisition rate and transmittal rate may range from 5-10 Hertz (Hz)±10%, or alternatively from 6-12 Hz±10%, or 7-15 Hz±10%.

Figure 3A:
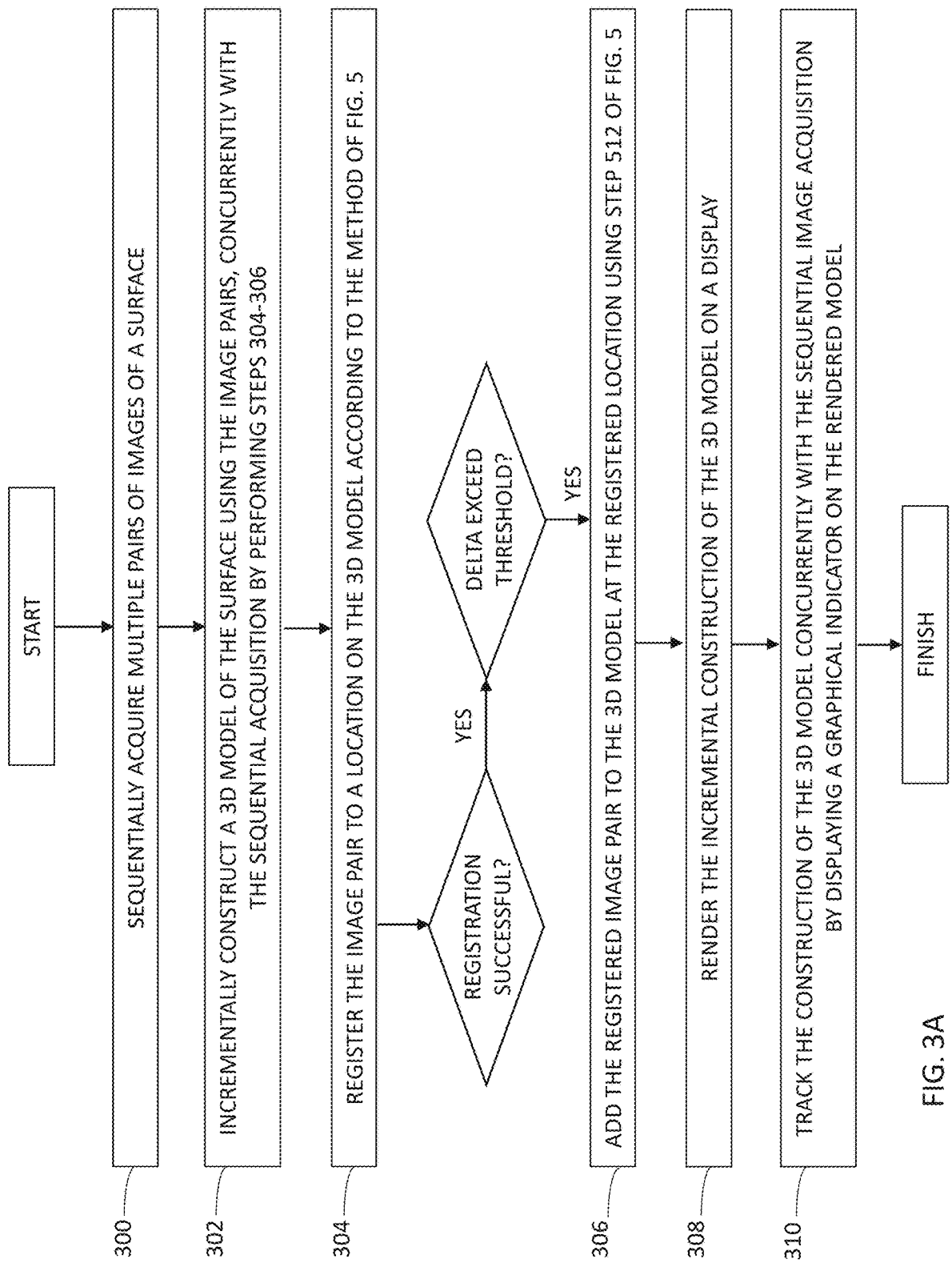
FIGS. 3A-3B shows a flowchart of a method for tracking the construction of a 3D model of a surface from multiple image pairs acquired by any of the systems of FIGS. 1A-1B, and 2A-2B, in accordance with an embodiment.

Reference is now made to FIG. 3A which shows a flowchart of a method for the real-time tracking of the scanning of a 3D surface using the system of either of systems 100 or 200, in accordance with an embodiment. The image construction and tracking be implemented by processor 112 operative with memory 118 and display 116.

Multiple pairs of stereoscopic images of a surface may be acquired sequentially from a camera (Step 300). A 3D model of the surface may be constructed incrementally from the image pairs concurrently with the sequential image acquisition (Step 302). The incremental construction may include performing Steps 304-306, for each currently acquired image pair: the currently acquired image pair may be registered to a location on the 3D model (Step 304), details of which are provided below with respect to FIG. 5; if the registration succeeds and if a delta between the registered image pair exceeds a predefined threshold, the currently acquired image pair may be added to the 3D model at the registered location (Step 306), such as by performing Step 512 of FIG. 5. The incremental construction of the 3D model may be rendered on a display (Step 308). The incremental construction of the 3D model may be tracked concurrently with the sequential image acquisition (Step 310), such as by displaying a graphic indicator on the rendition of the incremental construction of the 3D model. The graphic indicator may simultaneously indicate on the rendered 3D model both the registered location, and when the current camera-to surface viewing distance is within a focal range of the camera, and when the current camera-to surface viewing distance is not within a focal range of the camera. This allows the user to observe the scanned surface region using the 3D model as a reference, allowing him to maneuver the camera according to the regions of the model that require additional scanning. It also provides the user with feedback that the images that are currently being scanned are in focus and are thus registered and added to the model.

The tracking indicator may have multiple different attributes to indicate various system parameters, allowing the user to adjust the position of the camera and/or speed of acquisition in response to the indications. For example, the tracking indicator may be displayed as a spot indicating to the user the viewing distance between the camera and the surface for the most recently registered image pair. Optionally, as the user moves the camera closer to the surface to acquire images, the tracking indicator will be smaller. Conversely, as the camera is moved further from the surface to acquire images, the tracking indicator will be larger. Thus the user may follow the position of the spot on the rendered model to view where on the model the currently acquired images are being added and registered, and the tracking indicator on the spot may indicate the distance between the camera and the surface. This tracking feedback may be provided in real-time while scanning the surface, allowing the user to adjust any of the scanning region and the distance to the surface, and the scanning speed, accordingly, and acquire well-focused images from relevant regions of the surface.

Alternatively, the size of the tracking indicator 'spot' may be constant, indicating where on the model the currently acquired image pair is registered, and added. A separate distance indicator may be displayed to indicate to the user a comparison between the current viewing distance and optimal viewing distance for the imaging system, as follows:

a) When the current distance between the camera and the surface is outside an optimal focal range but still within an image registration range and thus the acquired images are of a sufficient quality to allow using them for constructing the 3D model, the distance indicator may be displayed to warn the user that distance is near the focus threshold, beyond which registration will fail. The focus threshold may be a predetermined property of the imaging system. The distance indicator may indicate a comparison between the current viewing distance and the optimal distance. For example, the size of the tracking indicator may correspond to an optimal focal distance, and the size of the distance indicator may correspond to the current viewing distance. The two indicators may be superimposed in a manner to view both simultaneously, i.e. one of the indicators may be transparent. Thus, if the distance indicator is larger than the tracking indicator, the camera is too far and the user is warned not to increase the distance lest registration will fail, and if the distance indicator is smaller than the tracking indicator, the camera too close and the user is warned not to decrease the distance lest registration will fail.

b) When the current distance between the camera and the surface is within the optimal focal range, the tracking indicator may be displayed using the 'successful registration color', (i.e. green) and may be displayed alone, without the distance indicator, indicating to the user that the images acquired at the current distance are within the optimal focal range and are being successfully registered.

c) When the current distance between the camera and the surface is outside the focus threshold of the optimal focal range, the tracking indicator may be displayed using the 'failed registration color', (i.e. red) and may be displayed alone, without the distance indicator, indicating to the user that the images acquired at the current distance are not in focus, and thus are not being registered, and the system must 'relock' the registration.

Thus, the combination of the tracking and distance indicators may allow the user to adjust the current viewing distance in real-time while scanning to remain within a range of the optimal focal distance and acquire quality, focused images.

The graphic tracking indicator may indicate when the registration succeeds and thus, the images acquired from the scanning are being added to the model, and conversely when the registration fails. For example, successful registration may be indicated by displaying the indicator in one color, such as green, and failed registration may be indicated by the displaying the indicator in a different color, such as red. A red 'failed registration' indication may allow the user to maneuver the camera while executing a relocking of the image acquisition to the construction of the 3D model, details of which are provided below with respect to FIG. 4. Optionally, the user may indicate a new registration location on the 3D model, and may adjust the distance of the camera to focus on the new registration location. The tracking may follow this adjustment providing the user with feedback to successfully relock.

Reference is now made to FIGS. 4A-4D, which show an exemplary implementation of the tracking method described above with respect to FIG. 3A.

Figure 4A:
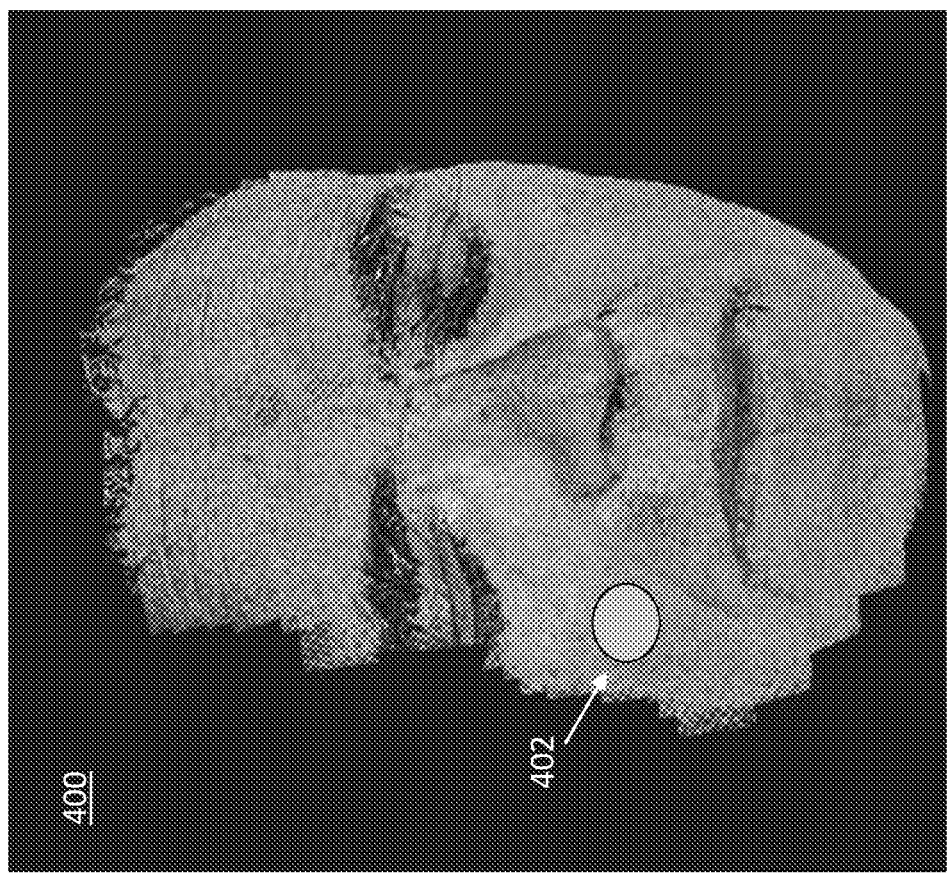
FIGS. 4A-4D, show an exemplary implementation of the tracking method described with respect to FIG. 3A.

Referring to FIG. 4A, a tracking indicator 402 is shown overlaid on a 3D model 400. Indicator 402 is shown as a spot (green) corresponding to an optimal focal distance between the camera and the surface, and The position of indicator 402 indicates the location on the model of the most recently registered image pair. The color of indicator 402 (green) indicates successful registration of the acquired image stream, and thus the distance between the camera and surface is within the focal range of the imaging system. The absence of the additional distance graphic indicator indicates that the distance is within a predefined range of the optimal focal distance.

Figure 4B:
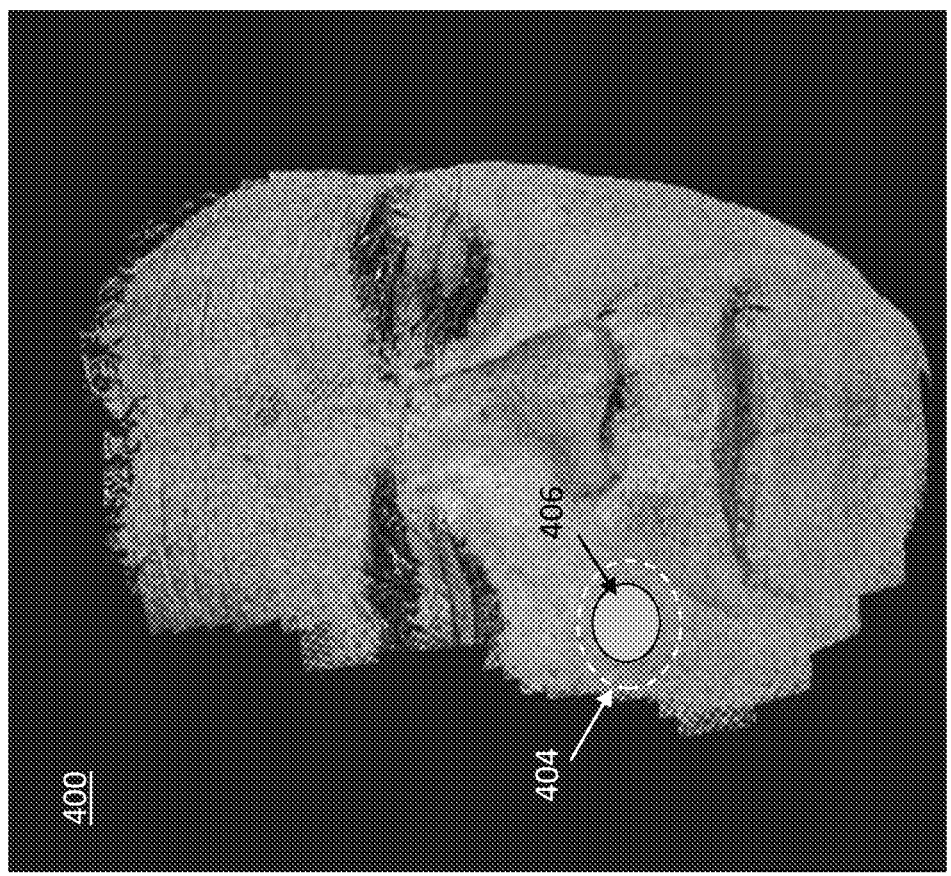

Referring to FIG. 4B, two graphic indicators: distance indicator 404 and tracking indicator 406 are shown superimposed with each other. The size of distance indictor 404 (outer dashed ring) is scaled to correspond to the camera-to-surface distance for the most recently acquired image pair, and the size of tracking indicator 406 (inner spot) is constant, indicating to the user that the current scanning distance exceeds the optimal scanning distance. However, the color of indicators 404 and 406 (green) show that the camera is still within a threshold range of the optimal distance that allows the images acquired from the scanning to be registered. This feedback warns the user not to increase the distance else the registration will fail, and allows the user to adjust the distance to conform with the optimal range.

Figure 4C:
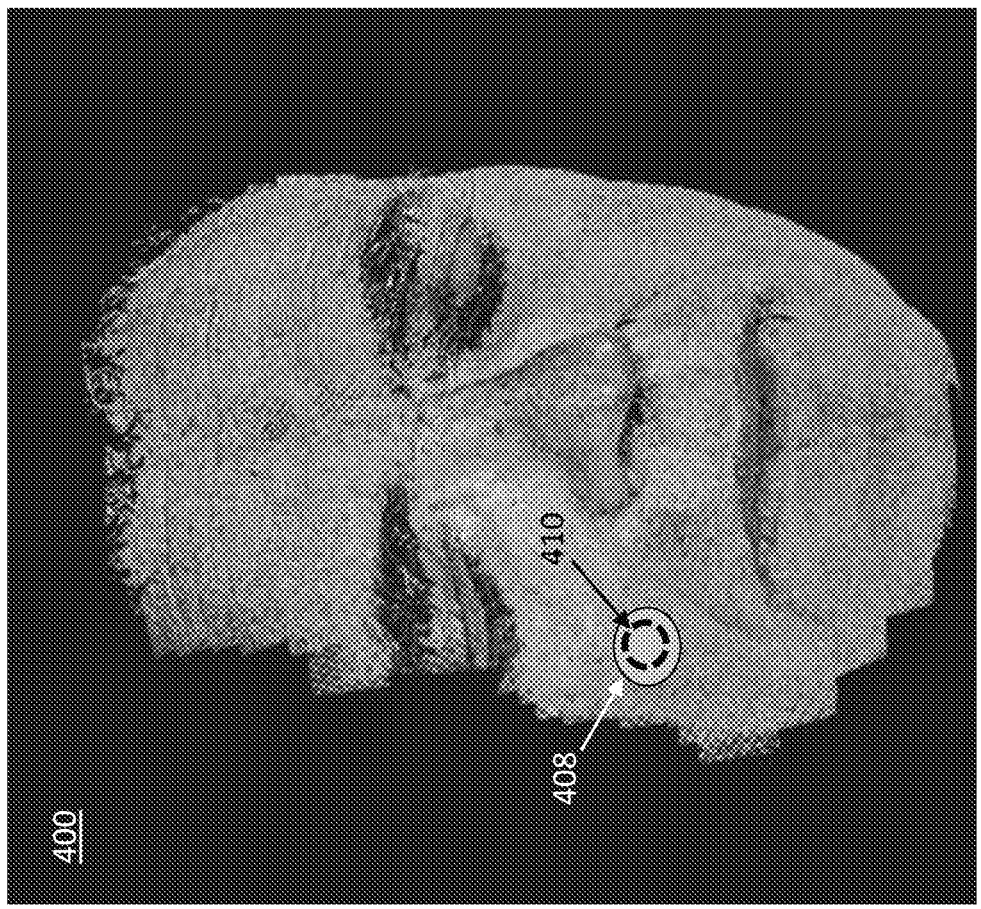

Referring to FIG. 4C, two graphic indicators: tracking indicator 408 and distance indicator 410 are shown superimposed with each other. The size of distance indictor 410 (inner dashed ring) is scaled to correspond to the camera-to-surface distance for the most recently acquired image pair, and the size of indicator 408 (outer spot) is constant, indicating to the user that the distance is smaller than the optical focal distance. As above, the color attribute of indicators 408 and 410 (green) indicates that the distance is still within a threshold range of the optimal focal distance, and thus the images acquired from the scanning are being registered successfully. This feedback warns the user not to decrease the distance else the registration will fail, and allows adjusting the distance accordingly.

Figure 4D:
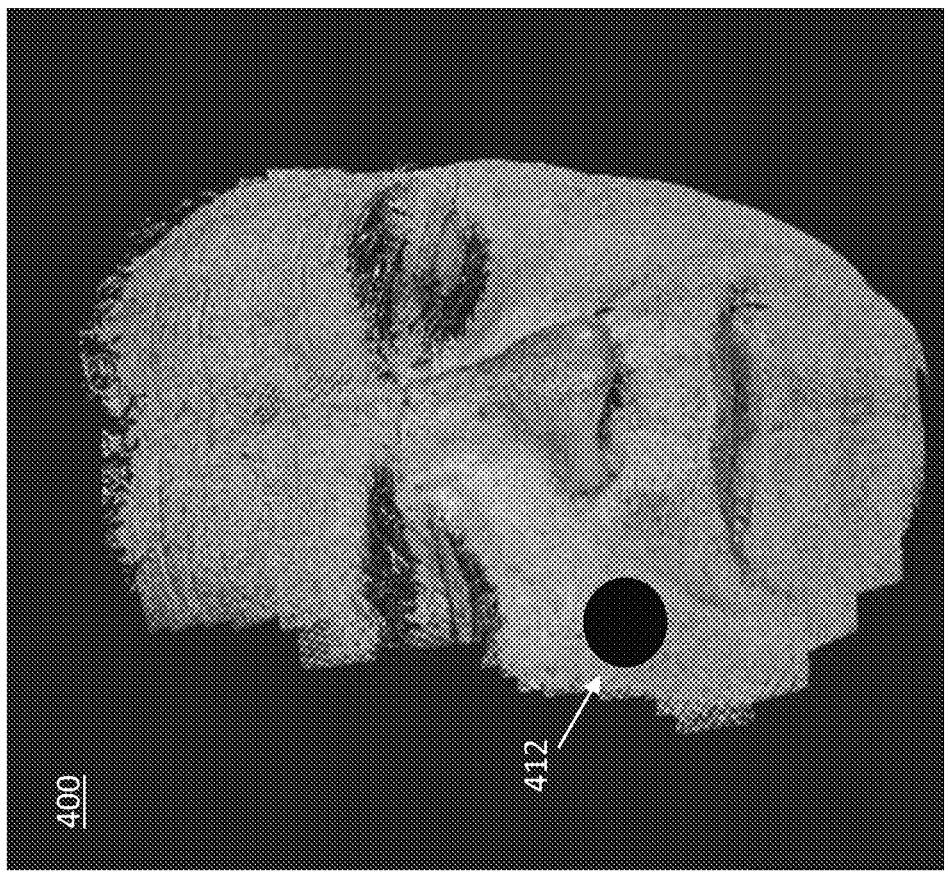

Referring to FIG. 4D, the color of indicator 412 (red) indicates that the camera is outside the threshold focus range and the acquired images are not being registered. The color attribute of indicator 412 may be substantially different than the color attributes of indicators 402-410 of FIGS. 4A-4C, to give a clear indication that the image registration at the current orientation and/or distance failed.

It may be appreciated that the specific graphical shapes and/or colors for indicators 402-412 are exemplary implementations only, and other suitable graphical depictions may be used. Some possible threshold values are 20 mm, or 15 mm, or 25 mm. The color attribute of indicators 402-410 in FIGS. 6A-6C may be the same, to indicate successful tracking for all of these scenarios.

Figure 5:
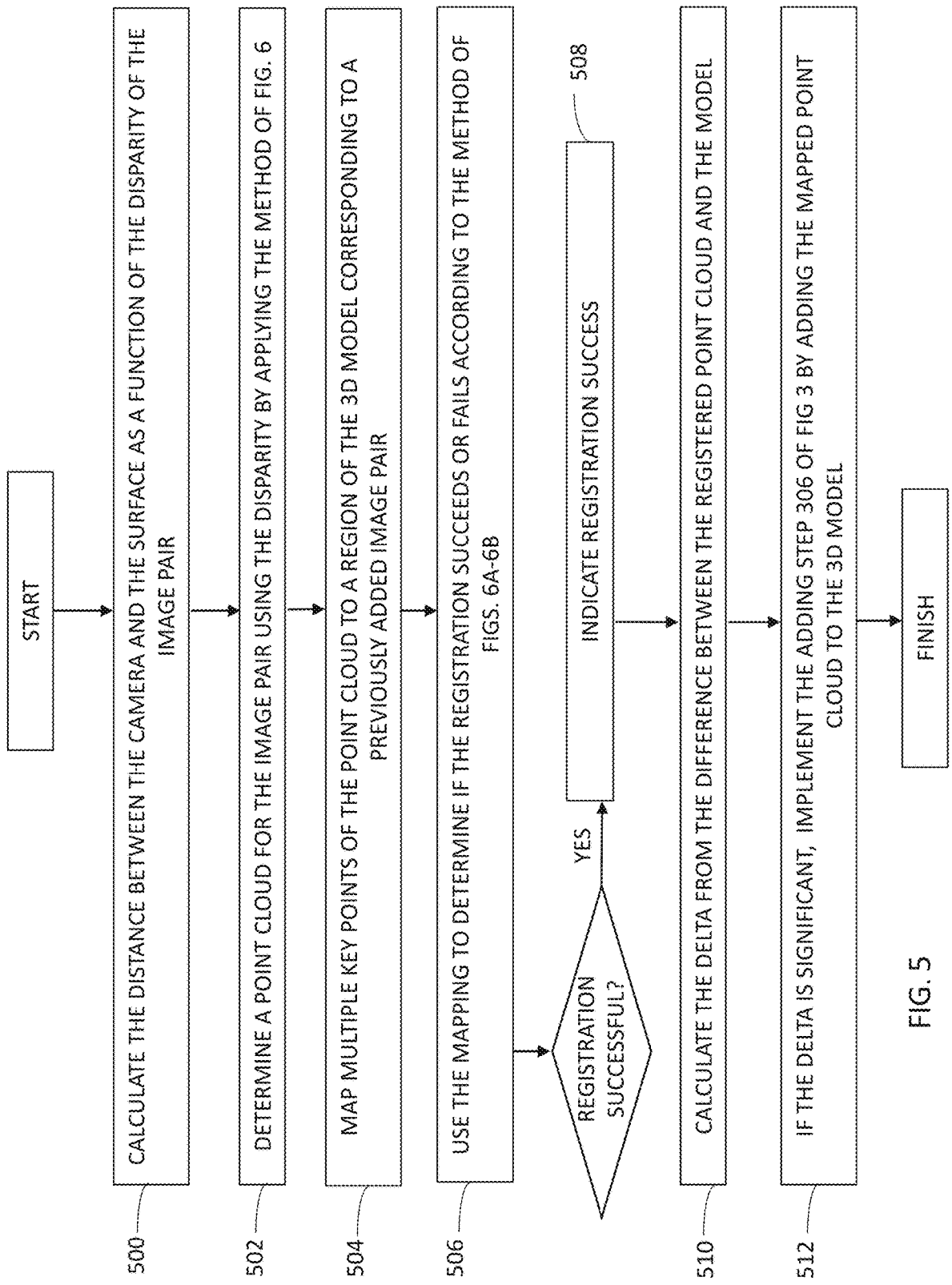
FIG. 5 shows a flowchart of a method to register of the currently acquired image pair to the 3D model, in accordance with an embodiment.

Reference is now made to FIG. 5 which shows a flowchart of method to register of the currently acquired image pair to the 3D model, in accordance with an embodiment. A distance between the camera and the surface may be calculated as a function of a disparity of the currently acquired image pair (Step 500), for example, by applying Eq. 1 above. A point cloud for the currently acquired image pair may be determined using the calculated distance (Step 502). For example, the point cloud may be determined using the method described in greater detail below with respect to FIGS. 6A-6B.

Multiple key points in the point cloud of the currently acquired image pair may determined, and then mapped to corresponding multiple key points of a point cloud of the 3D model (Step 504). The mapping may be used to determine if the registration succeeds or if the registration fails (Step 506). A more detailed description of Step 506 is given by steps 610-614 of FIG. 6B. If the registration succeeds, indicate the success (Step 508), and calculate the delta between the registered image pair and the 3D model, for example as a function of a discrepancy between the mapped point cloud and the 3D model (Step 510). If the delta is significant and exceeds the threshold, the mapped point cloud may be added the to the 3D model (Step 512), corresponding to the adding step 306 of FIG. 3A.

Figure 6A:
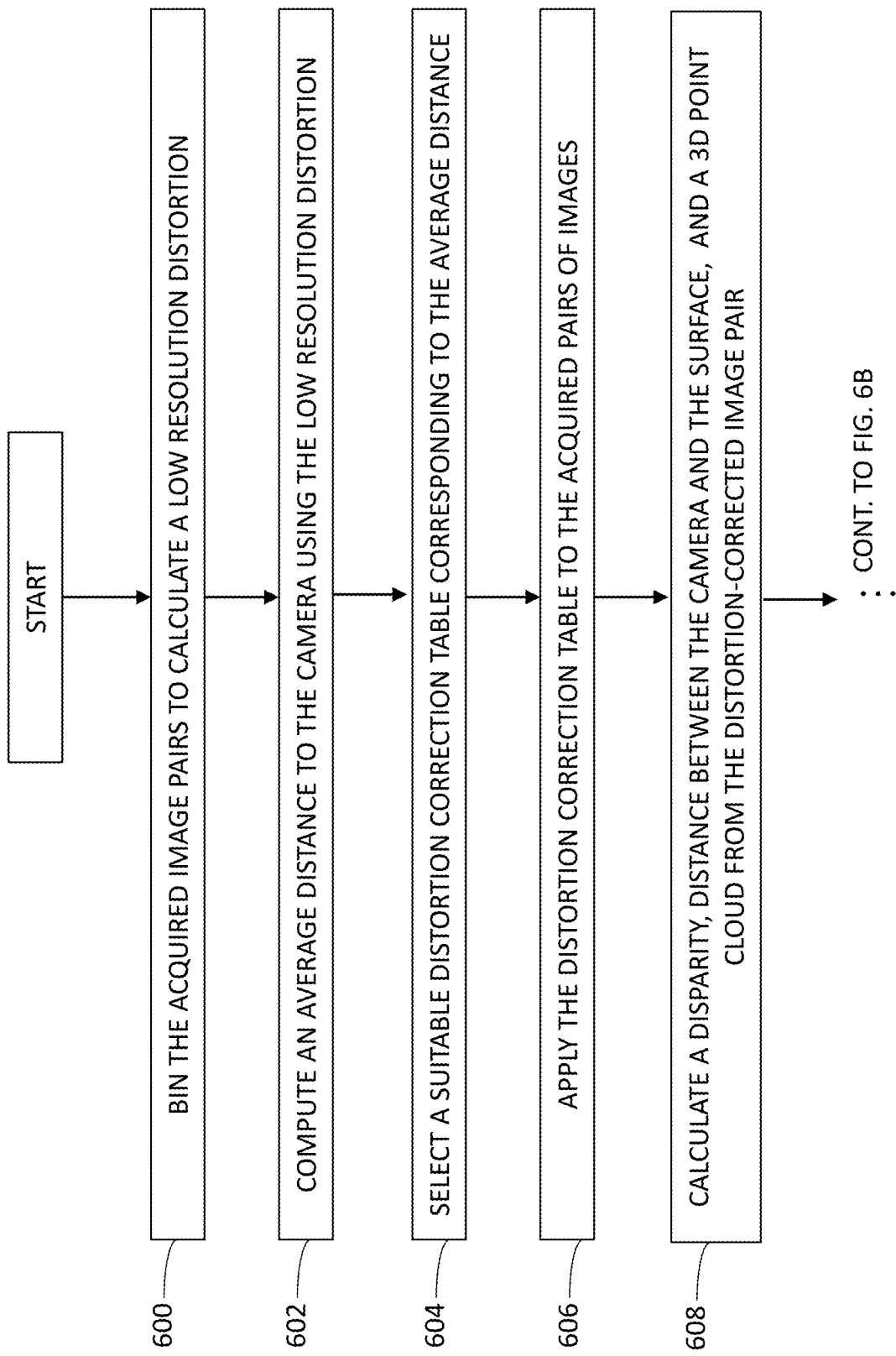

Reference is now made to FIGS. 6A-6B which shows a flowchart of a method to register a point cloud of a currently-acquired image pair to a previously-calculated point cloud, in accordance with an embodiment.

A received high-resolution pair of images may be binned, for example by combining the pixel values in a 2×2 or 3×3 or 4×4 or 5×5 or 6×6 binning operation and a low resolution distortion may be calculated from the binned images (Step 600).

An average distance between the camera and the 3D surface may be calculated using the low resolution calculation of the distortion (Step 602).

The average distance may be used to select a distortion correction table corresponding to the average distance (Step 604). Optionally, the distortion table may be selected from multiple distortion correction tables stored in memory 118.

The selected distortion table may be applied to correct the distortion of the image pair (Step 606). The distortion corrected high-resolution image pair may be used to calculate a disparity of the corrected image pair, and may be used for the disparity value of Step 502 of FIG. 5.

Additionally, the distortion corrected images may be used to calculate the angle and the distance between the camera and the surface, as well as determining the 3D point cloud of Step 502 of FIG. 5, as defined by Eq. 1 (Step 608). The angle may be used to reorient the model, as described below with respect to FIG. 8.

Multiple key points in the 3D point cloud may be determined (Step 610).

The key points may be mapped to corresponding reference key-points identified in the point cloud of the 3D model, such as may be located in proximity to a region corresponding to a previously successfully added image pair (Step 612). This yields multiple pairs of key points, each pair having a key point from the current point cloud and the previous point cloud (of the 3D model).

Then, a registration transformation matrix is calculated using the matched pairs of key-points, to correctly register (by rotation, distortion, etc.) the two point clouds (Step 614).

If the registration is successful, the method may continue to Step 508 of FIG. 5. If the registration is not successful, the indicator may indicate the registration failure (Step 622), providing the user with feedback such that he can reposition the camera and acquire images starting from the location indicated by the indicator. Repositioning thus may allow the point clouds determined from subsequently acquired image pairs to be registered and added to the 3D model. For example, if the distance between the camera and surface is greater than a predefined distance, and/or if the acquired images are out of focus, and/or the user moved the camera too quickly across the surface, registration of the acquired images may fail, and the indication of such allows the user to maneuver the camera to allow relocking the image acquisition onto the 3D model construction. Thus, responsive to the registration failure, subsequent image acquisition may be re-locked onto the 3D model by attempting to register the most recently acquired image pair at a location on the 3D model that is in proximity to a location corresponding to a previously added image pair, using the method of FIG. 5, until the registration succeeds (Step 624). For example, registration may be attempted with respect to previously registered and/or added images, such as going back to the tenth, twentieth, thirtieth, or fortieth most recently added image pairs, allowing to account for the camera's motion away from the most recently added image pair. Thus, the previously added image pair may be selected from a group consisting of: the ten most recently added image pairs, or the twenty most recently added image pairs, or the thirty most recently added image pairs, or the forty most recently added image pairs.

Since the registration algorithm may require more processing for each frame than the tracking algorithm, registering every acquired image pair may result in latency that causes a discrepancy between the restored position on the 3D model and the location of the most recently acquired image pair. To address this, the registration algorithm may skip over some of the acquired images, and use the most recently acquired image pair to relock the image acquisition onto the 3D model. For example, images that are very similar to the registered region, and provide little new information and thus have a small delta with the registered region, may be discarded.

Figure 7:
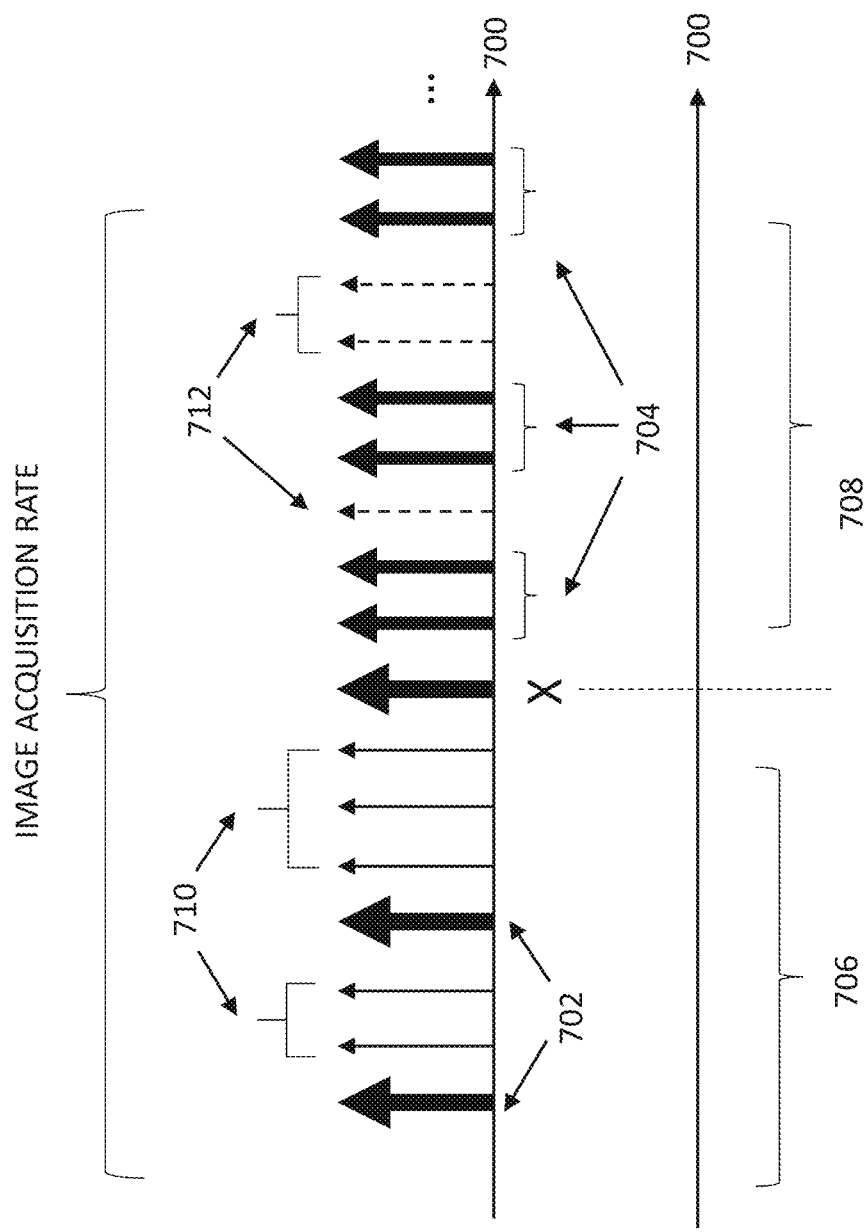
FIG. 7 shows timelines comparing the rates for the image acquisition, registration, and relocking, in accordance with an embodiment.

Referring to FIG. 7, a time line 700, shown twice for the purpose of clarity, is shown comparing the rates for the image acquisition, registration, and relocking. The image acquisition rate is indicated by the combination of all the arrows, and may remain constant. During the 'attempt relocking' period 706, unless the user has indicated otherwise, the processor attempts to register incoming images to a constructed portion of the 3D model. Registration may be attempted with respect to previously added images, such as the tenth, twentieth, thirtieth most recently added image, and the like. Alternatively, the processor attempts to register the incoming images in proximity to a location on the 3D model indicated by the user. Relocking may require substantial computational resources, and thus the rate for the attempted relocking, indicated by the thick arrows (702), may be slower than the image acquisition rate. After a failed attempt at relocking, the processor uses the most recently acquired image pair for the subsequent attempt, and discards any images acquired in the interim. In the example shown, registration is attempted for the first, fourth, and ninth acquired image pair, thus the relocking rate may not necessarily be uniform. After attempting to register the first image, corresponding to the first (bold) arrow 702 from the left, the acquired images, corresponding to the $2^{nd}$ and $3^{rd}$ arrows from the left (thin solid arrows 710) are discarded, and the processor attempts to register the $4^{th}$ acquired image pair, corresponding to the second bold arrow 702 from the left. Similarly, due to latency in attempting to match the $4^{th}$ pair of images, the $6^{th}$, $7^{th}$ and $8^{th}$ images (thin solid arrows 710) are discarded as well. Finally, the processor succeeds in registering the $9^{th}$ incoming image pair, as indicated by the 'X' under the $3^{rd}$ bold arrow from the left.

Once the relocking succeeds, the registered period begins, 708. Registration typically requires less computational resources than relocking, since the processor matches the incoming images onto a smaller region of the 3D model. Thus the image acquisition rate may not exceed the registration rate, allowing each incoming image to be registered. However, to conserve computational resources, optionally only images with significant information are added to the 3D model. The newly registered images are compared to the 3D model, and the discrepancy between them is determined. If the discrepancy is less than a threshold value, the images are discarded, as indicated by the thin dashed arrows 712. However, if the discrepancy is greater than the threshold value, and therefore the images contain a significant amount of new information, the images may be added to the 3D model, as indicated by the medium weight arrows 704. Values for the discrepancy threshold may range from 5% to 15%, or from 8% to 12%, or approximately 10%. The image discard rate may be non-uniform, for example, if the user lingers over a region for an extended period, many acquired images may be discarded, and if the user moves the camera over a region that was not previously scanned, few if any images may be discarded.

Reference is now made to FIGS. 8A-8E, which illustrate multiple scanning orientations and corresponding display orientations, in accordance with an embodiment. As the user manually maneuvers the camera about the 3D surface and changes the vertical and/or horizontal viewing angles, the perspective of the displayed 3D model may be adjusted accordingly ("reoriented") such that the currently registered region of the 3D model is prominently displayed, for example displayed at approximately the center of the screen and/or at approximately the center of a display area of the model. Optionally, to prevent the display from jumping or twitching in response to every change in the viewing angles, the display perspective may be adjusted conditional on the change in either of the vertical or horizontal viewing angles exceeding a threshold. Additionally or alternatively, smoothing may be applied to prevent such jumping or twitching, by relaxing sudden movements.

Figure 8A:
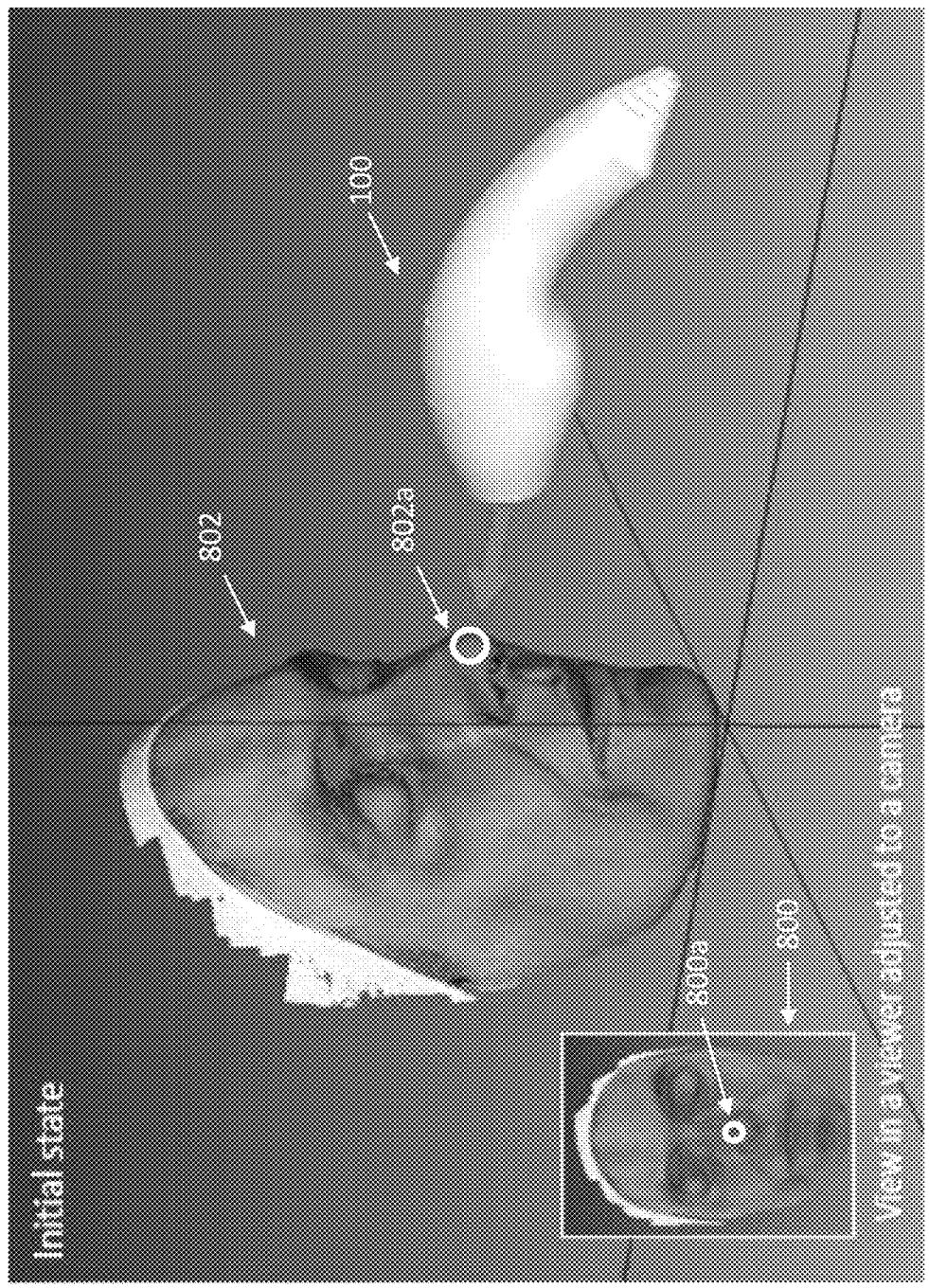
FIGS. 8A-8E show multiple scanning orientations and corresponding display orientations, in accordance with an embodiment.

Referring to FIG. 8A, an initial head-on, front perspective display 800 is shown, corresponding to the scanning of a patient's face 802 using camera 100 from a head-on front viewing angle. The currently scanned region (nose), indicated by white circle 802a is indicated on the displayed 3D model 800 at the location 800a corresponding to the registration of the acquired images. In this case, the currently registered location 800a corresponding to the currently scanned region 802a is displayed at the center of the displayed 3D model 800.

Figure 8B:
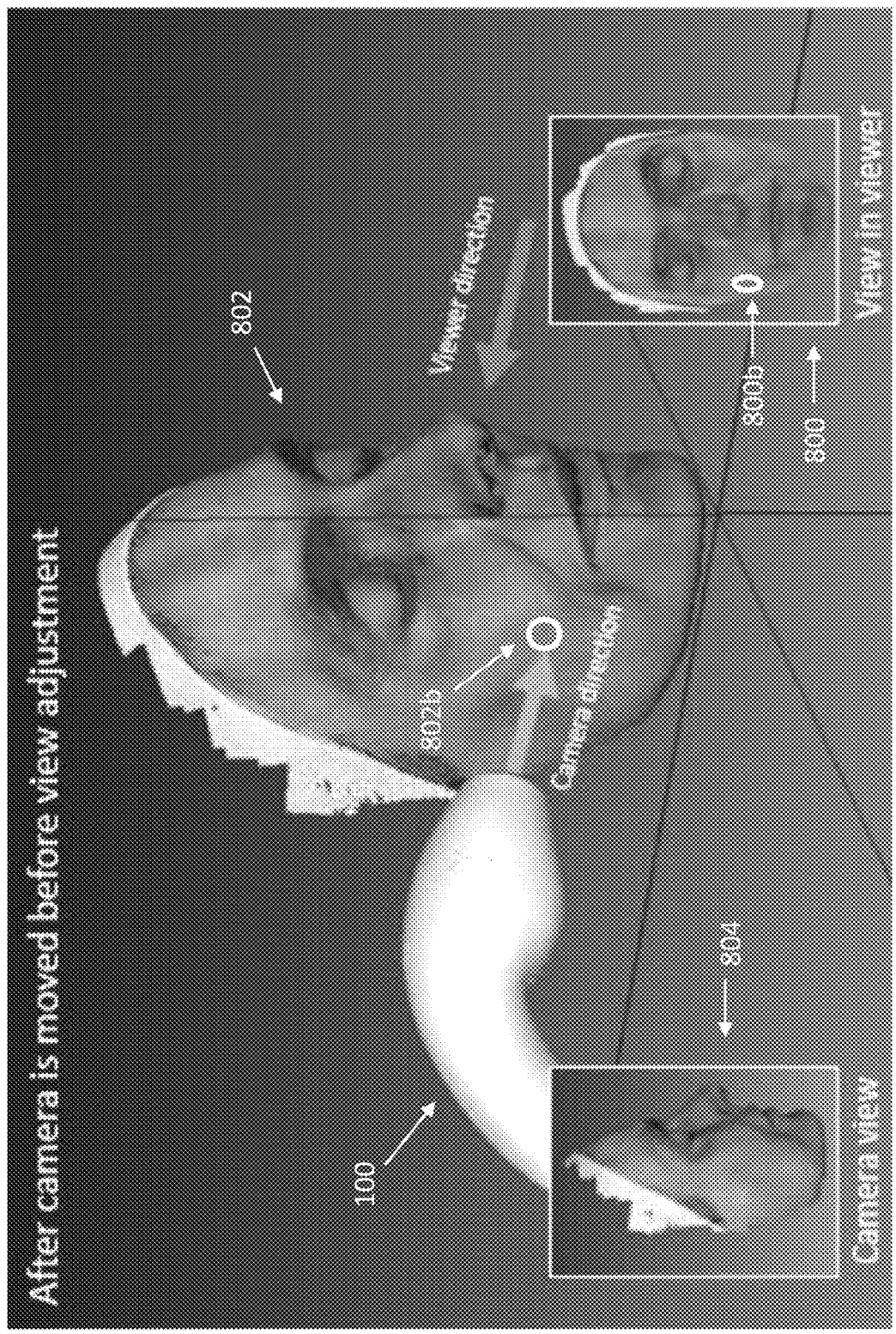

Referring to FIG. 8B, as the user maneuvers camera 100 around to the side of the patient's face 802, the camera viewing angle transitions from a front view to a side, profile view 804, to acquire images of the patient's cheek 802b. However, the display of the 3D model 800 has not been adjusted, and the perspective remains frontal. As a result, the location on the 3D model where the currently acquired images are registered is not displayed prominently at the center of the display, but rather over to the side, as indicated by the circle 800b corresponding to scanning region 802b.

Figure 8E:
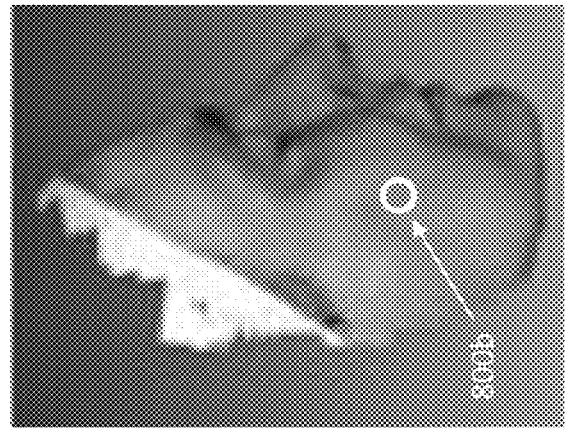
Figure 8C:
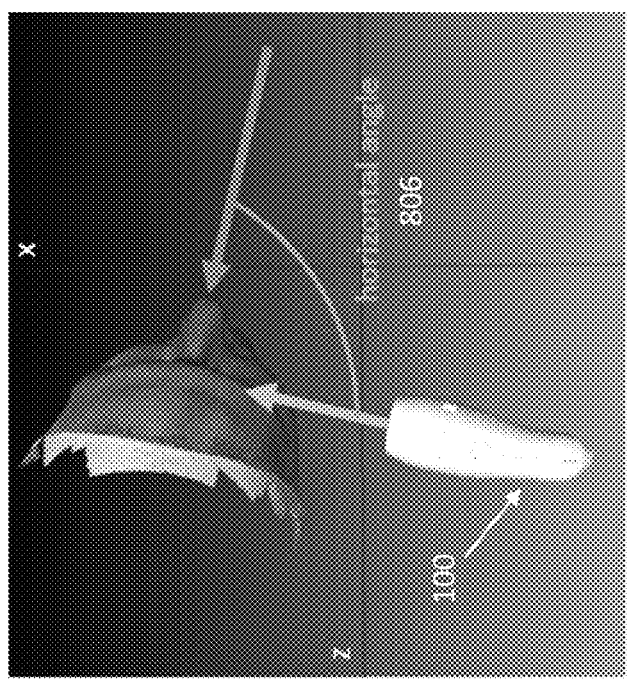
Figure 8D:
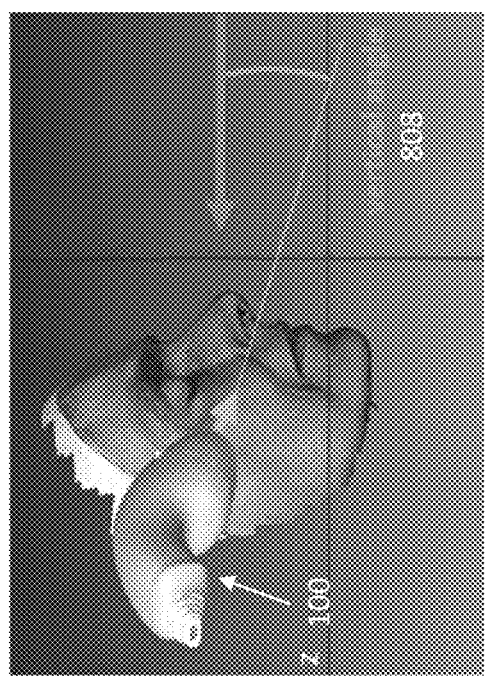

FIGS. 8C-8D shows the change in the horizontal viewing angle 806 and the vertical viewing angle 808, respectively, when moving from the front facing orientation of FIG. 8A to the side facing orientation of FIG. 8B. These angles may be measured by either calculating them using the registration locations of the 3D model, or by including a compass or gyroscope with camera 100, or any other suitable means. When the change in the viewing angles exceeds a threshold value, the perspective of the display may be adjusted such that the indication on the 3D model of the currently scanned region is prominently displayed for the user's convenience.

Referring to FIG. 8E, the orientation of the displayed 3D model 808 is shown adjusted to the profile view instead of the frontal view 800 shown in FIG. 8A, such that indication 800b, corresponding to the currently registered location, is located at the center of the displayed model 800.

Figure 8F:
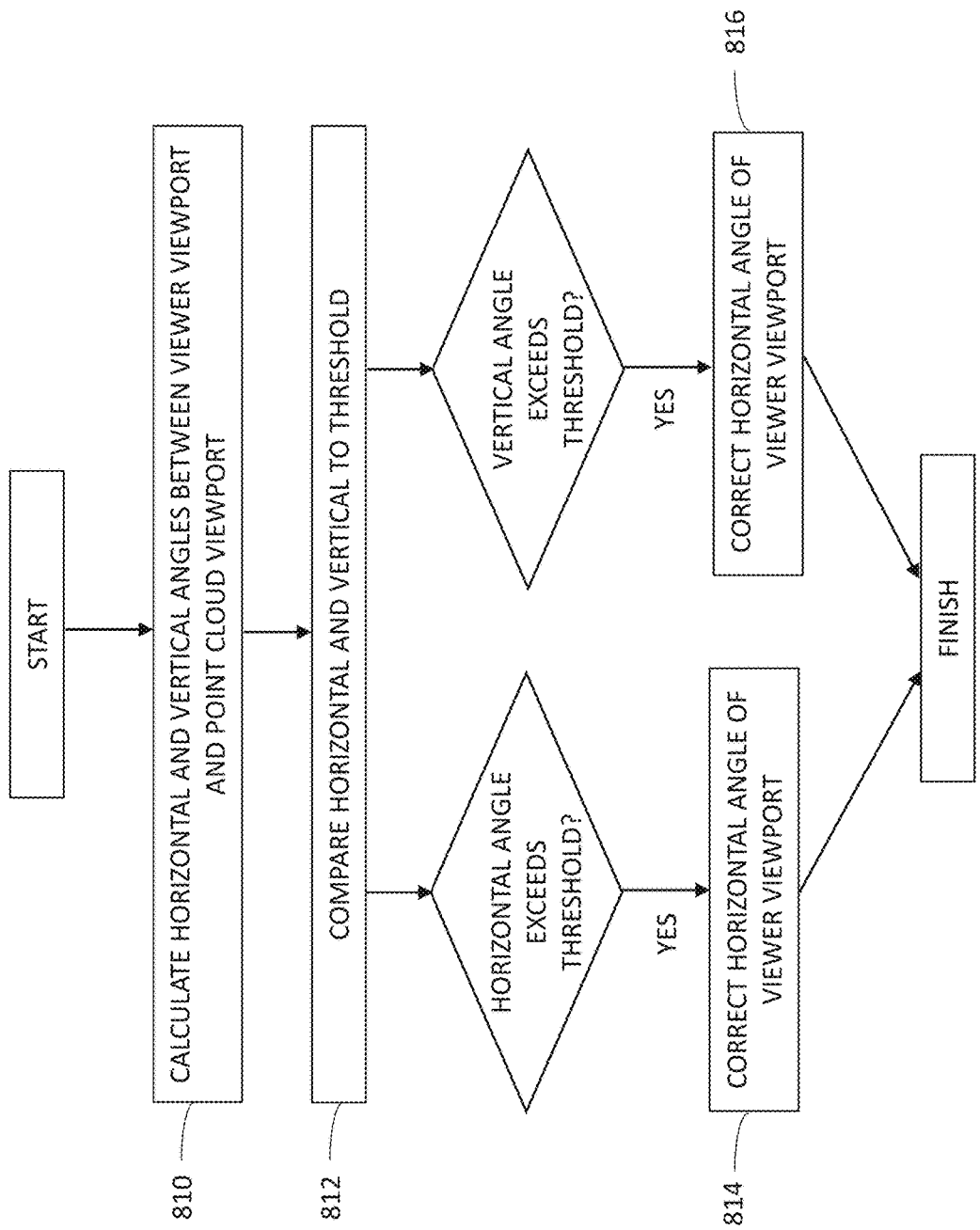
FIG. 8F shows a flowchart of a method for adjusting the orientation of the display, in accordance with FIGS. 8A-8E.

Reference is now made to FIG. 8F which shows a flowchart of a method for adjusting the orientation of the display, in accordance with FIGS. 8A-8E. During scanning, the orientation of the displayed 3D model may be continually adjusted to ensure that the graphic indication of the currently registered location on the 3D model is included in the displayed rendition. The horizontal and vertical angles between the viewer viewport and the point cloud viewport may be computed (Step 810). The computed horizontal and vertical angles may be compared to a threshold (Step 812). If the horizontal angle exceeds the threshold, the horizontal angle corresponding to the perspective of the display is adjusted (Step 814). If the vertical angle exceeds the threshold, the vertical angle corresponding to the perspective of the display is adjusted (Step 816).

The re-locking and real-time tracking algorithms described above may be used to track a current scan position onto a previously constructed 3D model, and thus add newly acquired images to the at least partially-constructed 3D model. The graphic indicator may be used to allow the user to navigate the focus of the camera to regions of the surface that had already been included in the previously scanned 3D model, such that newly acquired images can be registered to a location on the retrieved previously constructed 3D model. Once registered, the currently acquired image pair may be added to the previously constructed 3D model at the registered location, as described above. The rendition of the incremental construction may differentiate between the newly added acquired image pairs and the previously constructed 3D model. For example, the newly scanned regions may be rendered in a different color.

Figure 9B:
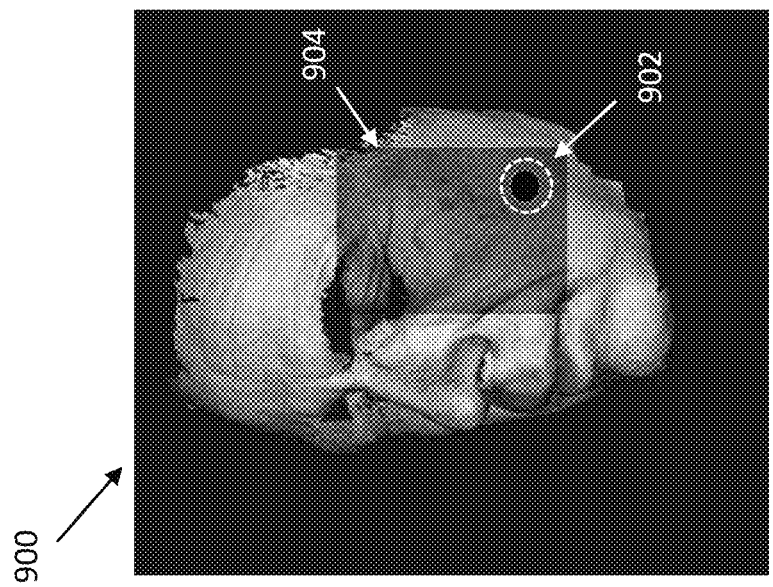
FIGS. 9A-9B show an implementation of adding newly acquired images to a previously constructed 3D model, in accordance with an embodiment.
Figure 9A:
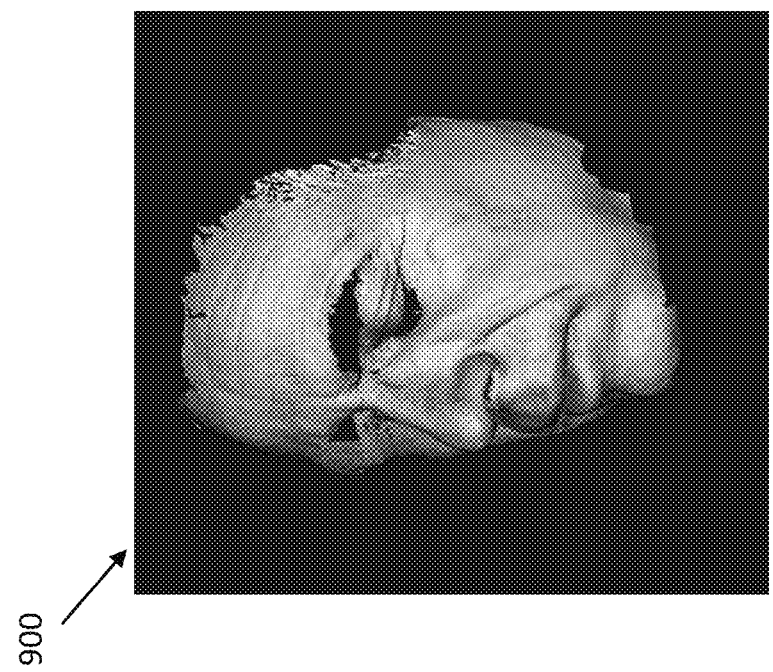

Reference is now made to FIGS. 9A-9B which show an implementation of adding newly acquired images to a previously constructed 3D model. FIG. 9A shows a partially constructed 3D model 900 of an individual's face that was stored in a memory 118 of processor 112 and opened for viewing on display 116. The user may indicate a region on the 3D model for relocking the image acquisition via interface 120 as described above. Once relocked, image registration may commence as indicated by graphic indicator 902 using the methods described above, to add newly acquired image pairs to the retrieved 3D model. The newly constructed portion of the 3D model 904, corresponding to the newly acquired images, may be rendered in manner to differentiate it from the 3D model that was retrieved from memory 118, such as by rendering the new portion 904 in a different color, shown for illustrative purposes only in grey. This allows the user to track the scanning and renewed construction of the 3D model relative to the previously constructed the 3D model.

Figure 10:
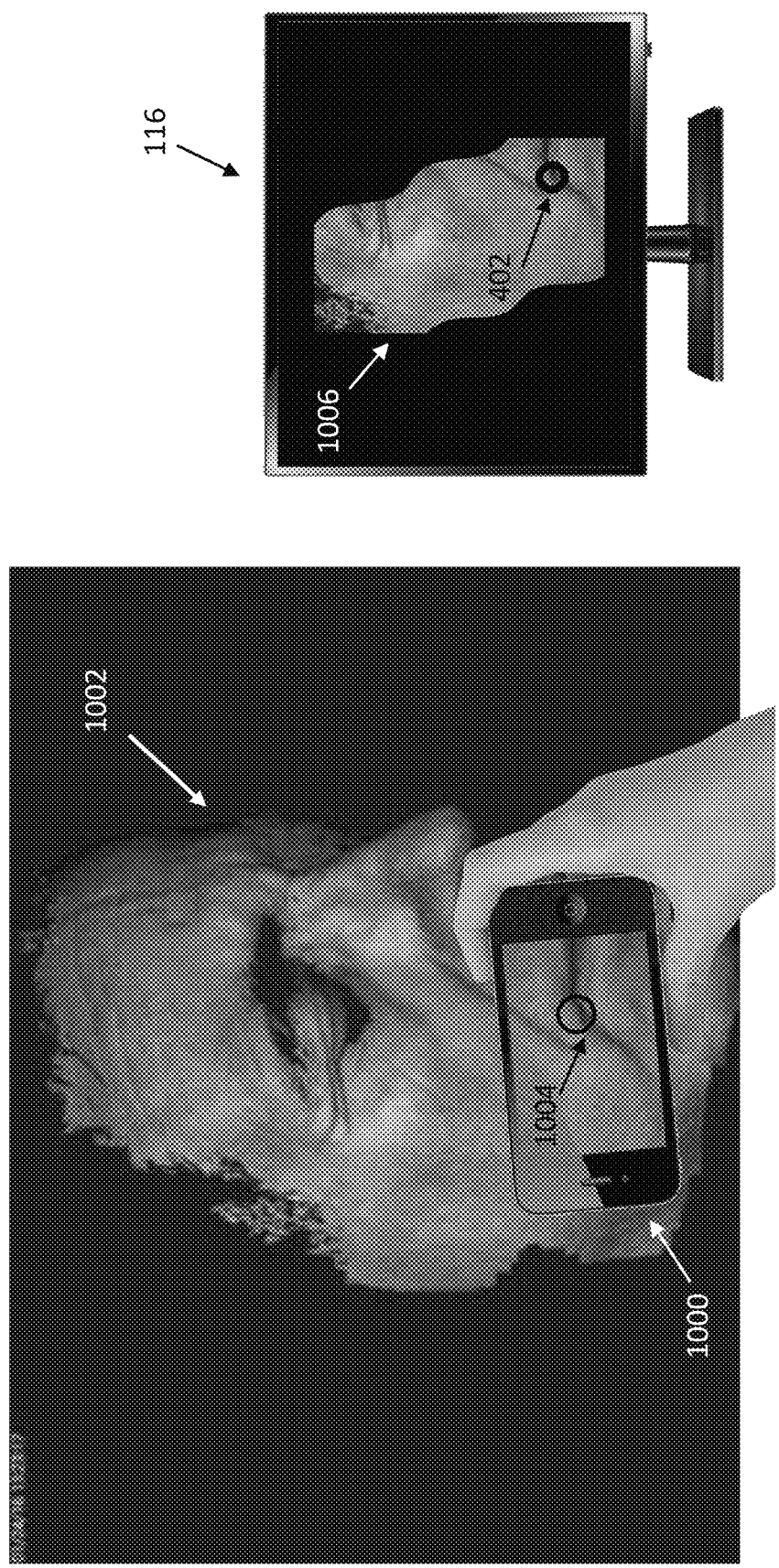
FIG. 10 shows a conceptual illustration of a system for tracking the scanning of a person's face in real-time, in accordance with an embodiment.

Reference is now made to FIG. 10, which shows a conceptual illustration of a system for tracking the scanning of a person's face in real-time, in accordance with an embodiment. A hand held scanning device 1000, such as any of cameras 100 or 200 above, scans a person's face 1002. The location of the scanning is indicated by the circle 1004 surrounding the corner of the person's mouth. The images acquired from the scanning are used by a processor (not shown) configured with device 1000 to construct a 3D model 1006 of the person's face. The construction of the model is rendered in real-time on display 116. While displaying the construction, the location of the currently scanned region is indicated on the rendition of the construction of the 3D model 1006 as circular indicator 402. Thus, the user of device 1000 receives real-time feedback with respect to the progress of the scan and can observe and track the construction of the model while scanning, allowing the user to adjust the speed and location of the scanning, accordingly. As can be seen from FIG. 10, the user has finished scanning the person's cheek, the 3D model 1006 of which is constructed and rendered on display 116. The user can now move the camera to the mouth and nose regions of the person's face to continue the 3D model construction, which will be rendered in real-time on display 116, with indicator 402 tracking the scanned region on the rendered model.

Figure 3B:
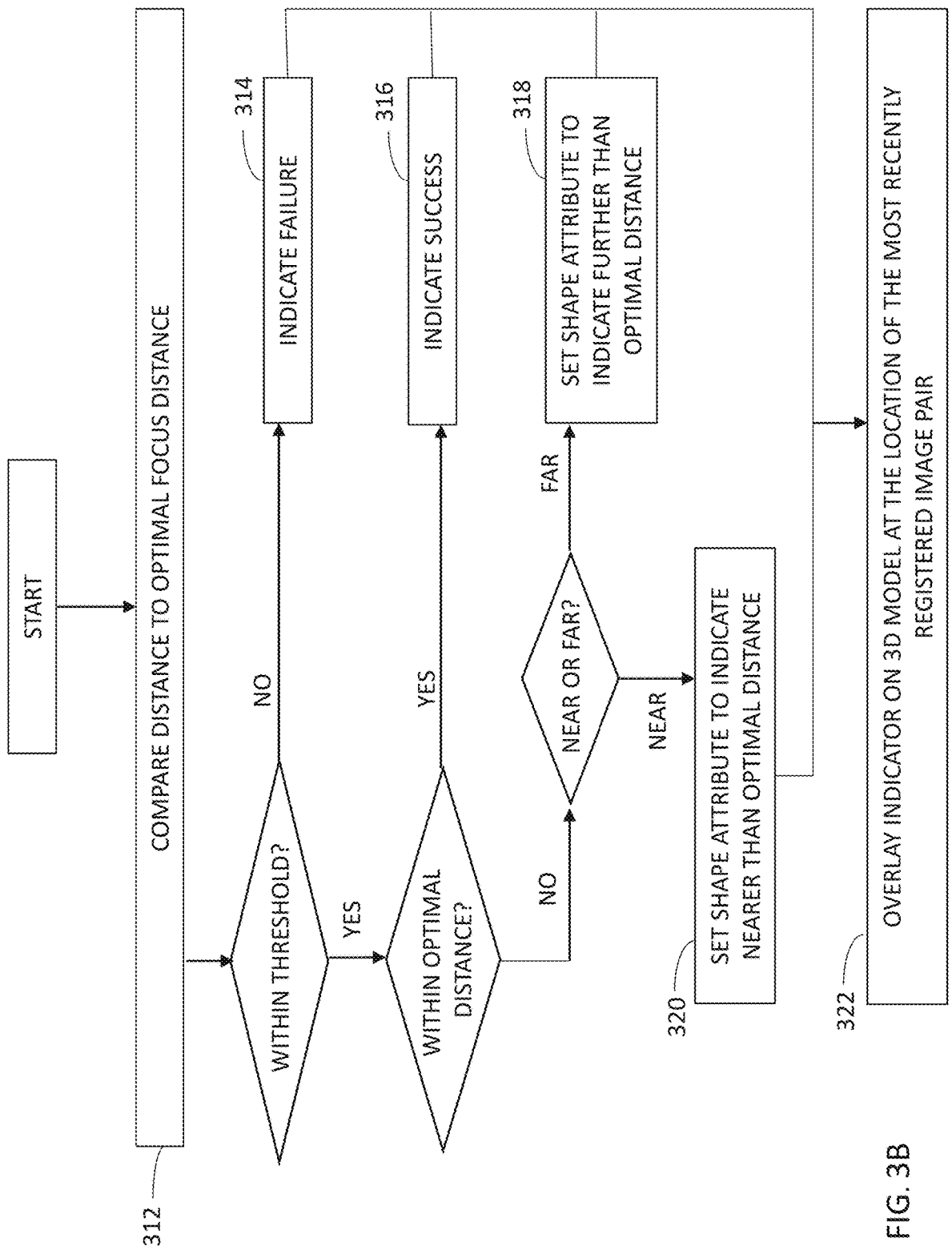

Reference is now made to FIG. 3B which is a flowchart of a method for implementing the real-time tracking of the scanning of a 3D surface of Step 310 of FIG. 3A using graphical indicators, in accordance with an embodiment.

A size attribute of a graphical distance indicator may be set to indicate the distance between the stereoscopic camera and the surface, such as by setting the size attribute to correspond to the current camera-to-surface viewing distance for the most recently registered image pair; a shape, pattern, or other visual attribute of the indicator may be set to indicate a comparison between the current viewing distance and the optimal viewing distance; and a color attribute of the indicator may be set to indicate the success of the registration.

The distance between the camera and the surface, such as calculated in Step 500 of FIG. 5, may be compared to an optimal camera focus distance (Step 312). If the distance is not within the threshold of the optimal focal distance, the color, shape, and size attributes of the indicator may be set to indicate a registration failure (Step 314). If the distance is within the threshold of the optimal focal distance, the color attribute of the indicator may be set to indicate a successful registration (Step 316). If the distance is within the threshold but is greater than the optimal distance, the shape attribute may be set to indicate a 'further than optimal distance' indication (Step 318). If the distance is within the threshold but is smaller than the optimal distance, the shape attribute may be set to indicate a 'nearer than optimal distance' indication (Step 320). The set indicator may be overlaid on the rendered 3D model at a location corresponding to the most recently successfully registered image pair (Step 322). Additionally, or alternatively, any of the indicators may comprise sounding an alert, and/or flashing a light.

The present invention may be a system, a method, and/or a computer program product. The computer program product may include a computer readable storage medium (or media) having computer readable program instructions thereon for causing a processor to carry out aspects of the present invention.

The computer readable storage medium can be a non-transitory, tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a stereoscopic camera configured to acquire multiple pairs of images of a surface;
    a display; and
    a processor configured to:
        sequentially acquire multiple pairs of stereoscopic images of a surface from the stereoscopic camera;
        incrementally construct a 3D model of the surface from the image pairs concurrently with the sequential image acquisition, wherein incrementally constructing comprises:
            for each currently acquired image pair,
                registering the currently acquired image pair to a location on the 3D model, and
                adding the currently acquired image pair to the 3D model at the registered location when: a) the registration succeeds and b) a delta of the registered image pair exceeds a threshold;
        rendering the incremental construction of the 3D model on the display; and
        concurrently with the sequential image acquisition, tracking the incremental construction of the 3D model by displaying a tracking graphic indicator on the rendition of the incremental construction of the 3D model that simultaneously indicates: i) the registered location, ii) when a viewing distance for the currently acquired image pair is within a focal range of the camera, and iii) when the viewing distance is not within a focal range of the camera,
    wherein said registering of the currently acquired image pair to a location on the 3D model is performed by:
        (i) calculating a distance between the camera and the surface as a function of a disparity of the currently acquired image pair,
        (ii) determining a point cloud for the currently acquired image pair using the calculated distance,
        (iii) mapping multiple key-points in the point cloud to a region on the 3D model in proximity to a most recently added image pair,
        (iv) determining from the mapping when the registration succeeds and when the registration fails, and
        (v) calculating the delta as a function of a discrepancy between the mapped point cloud and the 3D model when the registration succeeds, wherein adding the currently acquired image pair to the 3D model comprises adding the mapped point cloud to the 3D model; and
    wherein said determining of said point cloud is performed by:
        (vi) binning the image pair,
        (vii) calculating a low resolution distortion from the binned image pair,
        (viii) calculating an average distance from the low resolution distortion,
        (ix) using the average distance to select a distortion correction table corresponding to the average distance, and
        (x) applying the selected distortion table to correct a distortion of the image pair,
            wherein the disparity of the image pair comprises a disparity of the corrected image pair, and
            wherein determining a point cloud comprises determining the point cloud from the corrected image pair.

2. The system of claim 1, wherein the processor is further configured to indicate on the rendition of the incremental construction a comparison between a viewing distance of the currently acquired image pair and an optimal viewing distance.

3. The system of claim 2, wherein the processor is configured to indicate the comparison by displaying a distance graphic indicator corresponding to the viewing distance of the currently acquired image pair superimposed with the tracking graphic indicator.

4. The system of claim 1, wherein the processor is configured to track the incremental construction by indicating on the rendition of the incremental construction when the registration succeeds and when the registration fails.

5. The system of claim 4, wherein the processor is configured to indicate when the registration succeeds by displaying the tracking graphic indicator using a first color, and wherein the processor is configured to indicate when the registration fails by displaying the tracking graphic indicator using a second color.

6. The system of claim 1, wherein the processor is further configured to, responsive to determining that the registration fails, execute a relocking procedure.

7. The system of claim 6, wherein the relocking procedure comprises attempting to register the most recently acquired image pair in proximity to the registered location corresponding to a previously added image pair until the registration succeeds, wherein the previously added image pair is selected from a group consisting of: the ten most recently added image pairs, the twenty most recently added image pairs, the thirty most recently added image pairs, and the forty most recently added image pairs.

8. The system of claim 6, further comprising a user interface, wherein the processor is configured to receive a user-indicated location via the user interface, and wherein the relocking procedure comprises registering the most recently acquired image pair in proximity to the user-indicated location on the 3D model.

9. The system according claim 1, further comprising a memory, wherein the processor is further configured to retrieve a previously constructed 3D model from the memory, wherein registering the currently acquired image pair comprises registering to a location on the retrieved previously constructed 3D model, and wherein adding the currently acquired image pair at the registered location comprises adding the currently acquired image pair to the previously constructed 3D model.

10. The system of claim 9, wherein rendering the incremental construction further comprises differentiating between the added acquired image pairs and the previously constructed 3D model.

11. The system of claim 1, wherein the rendering the incremental construction of the 3D model on the display comprises continually adjusting the orientation of the 3D model responsive to detected changes in at least one of a horizontal and a vertical viewing angle of said stereoscopic camera.

12. The system of claim 11, wherein the processor is configured to calculate at least one of the horizontal and the vertical viewing angle of said stereoscopic camera from the distortion correction table.

13. A method for tracking the scanning of a surface, comprising:
sequentially acquiring multiple pairs of stereoscopic images of a surface from a camera;
incrementally constructing a 3D model of the surface from the image pairs concurrently with the sequential image acquisition, wherein incrementally constructing comprises:
for each currently acquired image pair,
registering the currently acquired image pair to a location on the 3D model, and adding the currently acquired image pair to the 3D model at the registered location when: a) the registration succeeds and b) a delta of the registered image pair exceeds a threshold;
rendering the incremental construction of the 3D model on a display; and
concurrently, with the sequential image acquisition, tracking the incremental construction of the 3D model by displaying a tracking graphic indicator on the rendition of the incremental construction of the 3D model that simultaneously indicates: i) the registered location, ii) when the viewing distance is within a focal range of the camera, and iii) when the viewing distance is not within a focal range of the camera,
wherein said registering of the currently acquired image pair to a location on the 3D model is performed by:

(i) calculating a distance between the camera and the surface as a function of a disparity of the currently acquired image pair,
(ii) determining a point cloud for the currently acquired image pair using the calculated distance,
(iii) mapping multiple key-points in the point cloud to a region on the 3D model in proximity to a most recently added image pair,
(iv) determining from the mapping when the registration succeeds and when the registration fails, and
(v) calculating the delta as a function of a discrepancy between the mapped point cloud and the 3D model when the registration succeeds,
wherein adding the currently acquired image pair to the 3D model comprises adding the mapped point cloud to the 3D model; and
wherein said determining of said point cloud is performed by:
(vi) binning the image pair,
(vii) calculating a low resolution distortion from the binned image pair,
(viii) calculating an average distance from the low resolution distortion,
(ix) using the average distance to select a distortion correction table corresponding to the average distance, and
(x) applying the selected distortion table to correct a distortion of the image pair,
wherein the disparity of the image pair comprises a disparity of the corrected image pair, and
wherein determining a point cloud comprises determining the point cloud from the corrected image pair.

14. The method of claim 13, further comprising adjusting the position of the camera in response to the tracking.

15. The method of claim 14, wherein adjusting the position comprises adjusting any of a scanning region, a distance between the camera and the surface, and a scanning speed.

16. The method of claim 14, wherein the tracking further comprises indicating when the registration succeeds and when the registration fails, the method further comprising, responsive to the indication that the registration failed, maneuvering the camera to allow relocking the image acquisition onto the 3D model construction.

17. The method of claim 16, further comprising indicating a new registration location on the 3D model, and adjusting the viewing distance of the camera in accordance with the new registration location.

18. The method according to claim 13, further comprising indicating on the rendition of the incremental construction a comparison between a viewing distance of the currently acquired image pair and an optimal viewing distance, and wherein adjusting comprises adjusting the distance according to the indicated comparison.

19. The method according to claim 13, further comprising retrieving a previously constructed 3D model from a memory, wherein registering the currently acquired image pair comprises registering to a location on the retrieved previously constructed 3D model, and wherein adding the currently acquired image pair at the registered location comprises adding the currently acquired image pair to the previously constructed 3D model.

20. The method of claim 19, wherein registering to a location on the retrieved previously constructed 3D model comprises registering to a location indicated via a user interface.

* * * * *